(12) United States Patent
Komatsu et al.

(10) Patent No.: US 11,305,837 B2
(45) Date of Patent: Apr. 19, 2022

(54) BICYCLE REAR SPROCKET ASSEMBLY

(71) Applicant: SHIMANO INC., Sakai (JP)

(72) Inventors: Atsushi Komatsu, Sakai (JP); Koji Yuasa, Sakai (JP); Takehiko Nakajima, Sakai (JP)

(73) Assignee: SHIMANO INC., Sakai (JP)

( * ) Notice: Subject to any disclaimer, the term of this patent is extended or adjusted under 35 U.S.C. 154(b) by 121 days.

(21) Appl. No.: 15/799,984

(22) Filed: Oct. 31, 2017

(65) Prior Publication Data

US 2019/0127022 A1    May 2, 2019

(51) Int. Cl.
  *B62M 9/12*    (2006.01)
  *F16D 1/10*    (2006.01)
  *F16H 55/30*   (2006.01)
  *F16H 57/00*   (2012.01)

(52) U.S. Cl.
  CPC ............. *B62M 9/12* (2013.01); *F16D 1/10* (2013.01); *F16H 55/30* (2013.01); *F16H 57/0025* (2013.01); *F16D 2001/103* (2013.01)

(58) Field of Classification Search
  CPC . B62M 9/10; B62M 9/12; F16H 55/30; F16D 2001/103; B22F 2998/00
  USPC ......................................................... 474/160
  See application file for complete search history.

(56) References Cited

U.S. PATENT DOCUMENTS

| | | | | |
|---|---|---|---|---|
| 5,503,600 | A * | 4/1996 | Berecz | B62M 9/10 474/160 |
| 5,690,568 | A * | 11/1997 | Watson | B22F 7/062 474/152 |
| 5,935,034 | A * | 8/1999 | Campagnolo | B62M 9/10 474/160 |
| 6,264,575 | B1 | 7/2001 | Lim et al. | |
| 7,959,529 | B2 * | 6/2011 | Braedt | B62M 9/10 474/152 |
| 8,197,371 | B2 * | 6/2012 | D'Aluisio | B62M 9/12 301/110.5 |
| 8,820,852 | B2 * | 9/2014 | Van Hoek | F16H 7/20 301/110.5 |
| 2006/0128511 | A1 * | 6/2006 | Oishi | B62M 9/10 474/160 |
| 2007/0054770 | A1 * | 3/2007 | Valle | B62M 9/10 474/160 |
| 2008/0231014 | A1 | 9/2008 | Braedt | |
| 2009/0042681 | A1 * | 2/2009 | Dal Pra' | B62M 9/10 474/160 |
| 2009/0042682 | A1 * | 2/2009 | Dal Pra' | F16H 55/30 474/160 |
| 2009/0215565 | A1 * | 8/2009 | Braedt | B62M 9/12 474/160 |

(Continued)

FOREIGN PATENT DOCUMENTS

| | | |
|---|---|---|
| CN | 101683885 | 3/2010 |
| CN | 103723236 | 4/2014 |

(Continued)

*Primary Examiner* — Henry Y Liu
(74) *Attorney, Agent, or Firm* — Mori & Ward, LLP

(57) ABSTRACT

A bicycle rear sprocket assembly comprises at least one sprocket and an internal cavity. The at least one sprocket includes at least ten internal spline teeth configured to engage with a bicycle hub assembly. The at least ten internal spline teeth have an internal-spline major diameter. The internal cavity has a maximum outer diameter larger than the internal-spline major diameter.

24 Claims, 33 Drawing Sheets

(56) References Cited

U.S. PATENT DOCUMENTS

| | | | |
|---|---|---|---|
| 2009/0215566 A1* | 8/2009 | Braedt | B62M 9/10 474/160 |
| 2010/0004081 A1* | 1/2010 | Braedt | B62M 9/10 474/160 |
| 2010/0009794 A1* | 1/2010 | Chiang | B62M 9/10 474/160 |
| 2010/0075791 A1* | 3/2010 | Braedt | B62M 9/10 474/160 |
| 2010/0099530 A1* | 4/2010 | Chiang | B62M 9/10 474/160 |
| 2011/0048889 A1* | 3/2011 | Vierk | F16D 13/648 192/107 R |
| 2011/0105263 A1* | 5/2011 | Braedt | F16H 55/303 474/160 |
| 2012/0244976 A1* | 9/2012 | Lin | B62M 9/10 474/160 |
| 2012/0244977 A1* | 9/2012 | Liao | B62M 9/10 474/160 |
| 2012/0244978 A1* | 9/2012 | Liao | B62M 9/10 474/160 |
| 2012/0302384 A1* | 11/2012 | Braedt | B62M 9/10 474/160 |
| 2012/0309572 A1* | 12/2012 | Braedt | B62M 9/10 474/160 |
| 2013/0017914 A1* | 1/2013 | Braedt | B62M 9/10 474/160 |
| 2013/0225343 A1* | 8/2013 | Spahr | B62M 9/10 474/160 |
| 2013/0294825 A1* | 11/2013 | Loeffler | F16D 1/06 403/359.1 |
| 2013/0343815 A1* | 12/2013 | Kenawy | F16D 1/101 403/359.1 |
| 2014/0179474 A1* | 6/2014 | Florczyk | B62M 9/10 474/160 |
| 2014/0255243 A1* | 9/2014 | Park | B22D 17/20 420/26 |
| 2015/0080160 A1* | 3/2015 | Staples | B62M 9/10 474/160 |
| 2015/0133249 A1* | 5/2015 | Tsai | B62M 9/12 474/160 |
| 2015/0210353 A1* | 7/2015 | Tokuyama | B62M 9/12 474/160 |
| 2015/0285358 A1* | 10/2015 | Numata | F16H 55/08 474/160 |
| 2016/0059932 A1* | 3/2016 | Braedt | B62M 9/10 474/160 |
| 2016/0083045 A1* | 3/2016 | Lin | B62M 9/10 474/160 |
| 2016/0114859 A1* | 4/2016 | Tsai | B62M 9/10 474/160 |
| 2016/0200395 A1* | 7/2016 | Braedt | B62M 9/10 474/160 |
| 2017/0247081 A1 | 8/2017 | Sugimoto | |

FOREIGN PATENT DOCUMENTS

| | | |
|---|---|---|
| CN | 107128433 | 9/2017 |
| EP | 1043221 A2 | 10/2000 |

* cited by examiner

# BICYCLE REAR SPROCKET ASSEMBLY

BACKGROUND OF THE INVENTION

Field of the Invention

The present invention relates to a bicycle rear sprocket assembly.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a sprocket assembly.

SUMMARY OF THE INVENTION

In accordance with a first aspect of the present invention, a bicycle rear sprocket assembly comprises at least one sprocket and an internal cavity. The at least one sprocket includes at least ten internal spline teeth configured to engage with a bicycle hub assembly. The at least ten internal spline teeth have an internal-spline major diameter. The internal cavity has a maximum outer diameter larger than the internal-spline major diameter.

With the bicycle rear sprocket assembly according to the first aspect, the at least ten internal spline teeth reduce a rotational force applied to each of the at least ten internal spline teeth in comparison with a sprocket including nine or less internal spline teeth. This improves durability of the at least one sprocket and/or improves a degree of freedom of choosing a material of the at least one sprocket without reducing durability of the at least one sprocket. Furthermore, the internal cavity saves a weight of the bicycle rear sprocket assembly.

In accordance with a second aspect of the present invention, the bicycle rear sprocket assembly according to the first aspect is configured so that a total number of the at least ten internal spline teeth is equal to or larger than 20.

With the bicycle rear sprocket assembly according to the second aspect, the at least twenty internal spline teeth further reduce the rotational force applied to each of the at least twenty internal spline teeth in comparison with a sprocket including nine or less internal spline teeth. This further improves durability of the at least one sprocket and/or improves a degree of freedom of choosing a material of the at least one sprocket without reducing durability of the at least one sprocket.

In accordance with a third aspect of the present invention, the bicycle rear sprocket assembly according to the second aspect is configured so that the total number of the at least ten internal spline teeth is equal to or larger than 25.

With the bicycle rear sprocket assembly according to the third aspect, the at least twenty-five internal spline teeth further reduce the rotational force applied to each of the at least twenty internal spline teeth in comparison with a sprocket including nine or less internal spline teeth. This further improves durability of the at least one sprocket and/or improves a degree of freedom of choosing a material of the at least one sprocket without reducing durability of the at least one sprocket.

In accordance with a fourth aspect of the present invention, the bicycle rear sprocket assembly according to the first aspect is configured so that the at least ten internal spline teeth have a first internal pitch angle and a second internal pitch angle different from the first internal pitch angle.

With the bicycle rear sprocket assembly according to the fourth aspect, the difference between the first internal pitch angle and the second internal pitch angle helps the user to correctly mount the bicycle rear sprocket assembly to the bicycle hub assembly, especially concerning a circumferential position of each sprocket of the bicycle rear sprocket assembly.

In accordance with a fifth aspect of the present invention, the bicycle rear sprocket assembly according to the first aspect is configured so that at least one of the at least ten internal spline teeth has a first spline shape different from a second spline shape of another of the at least ten internal spline teeth.

With the bicycle rear sprocket assembly according to the fifth aspect, the difference between the first spline shape and the second spline shape helps the user to correctly mount the bicycle rear sprocket assembly to the bicycle hub assembly, especially concerning a circumferential position of each sprocket of the bicycle rear sprocket assembly.

In accordance with a sixth aspect of the present invention, the bicycle rear sprocket assembly according to the first aspect is configured so that at least one of the at least ten internal spline teeth has a first spline size different from a second spline size of another of the at least ten internal spline teeth.

With the bicycle rear sprocket assembly according to the sixth aspect, the difference between the first size and the second size helps the user to correctly mount the bicycle rear sprocket assembly to the sprocket support body, especially concerning a circumferential position of each sprocket of the bicycle rear sprocket assembly.

In accordance with a seventh aspect of the present invention, a bicycle rear sprocket assembly comprises at least one sprocket and an internal cavity. The at least one sprocket includes a plurality of internal spline teeth configured to engage with a bicycle hub assembly. At least two internal spline teeth of the plurality of internal spline teeth are circumferentially arranged at a first internal pitch angle with respect to a rotational center axis of the bicycle rear sprocket assembly. The first internal pitch angle ranges from 10 degrees to 20 degrees. The plurality of internal spline teeth has an internal-spline major diameter. The internal cavity has a maximum outer diameter larger than the internal-spline major diameter.

With the bicycle rear sprocket assembly according to the seventh aspect, the first internal pitch angle reduces a rotational force applied to each of the at least ten internal spline teeth in comparison with a sprocket support body including nine or less internal spline teeth. This improves durability of the at least one sprocket and/or improves a degree of freedom of choosing a material of the at least one sprocket without reducing durability of the at least one sprocket. Furthermore, the internal cavity saves a weight of the bicycle rear sprocket assembly.

In accordance with an eighth aspect of the present invention, the bicycle rear sprocket assembly according to the seventh aspect is configured so that the first internal pitch angle ranges from 12 degrees to 15 degrees.

With the bicycle rear sprocket assembly according to the eighth aspect, the first internal pitch angle further reduces a rotational force applied to each of the at least ten internal spline teeth in comparison with a sprocket support body including nine or less internal spline teeth. This further improves durability of the at least one sprocket and/or improves a degree of freedom of choosing a material of the at least one sprocket without reducing durability of the at least one sprocket.

In accordance with a ninth aspect of the present invention, the bicycle rear sprocket assembly according to the eighth aspect is configured so that the first internal pitch angle ranges from 13 degrees to 14 degrees.

With the bicycle rear sprocket assembly according to the ninth aspect, the first internal pitch angle further reduces a rotational force applied to each of the at least ten internal spline teeth in comparison with a sprocket support body including nine or less internal spline teeth. This further improves durability of the at least one sprocket and/or improves a degree of freedom of choosing a material of the at least one sprocket without reducing durability of the at least one sprocket.

In accordance with a tenth aspect of the present invention, the bicycle rear sprocket assembly according to the seventh aspect is configured so that at least two internal spline teeth of the plurality of internal spline teeth are circumferentially arranged at a second internal pitch angle with respect to the rotational center axis. The second internal pitch angle is different from the first internal pitch angle.

With the bicycle rear sprocket assembly according to the tenth aspect, the difference between the first internal pitch angle and the second internal pitch angle helps the user to correctly mount the bicycle rear sprocket assembly to the bicycle hub assembly, especially concerning a circumferential position of each sprocket of the bicycle rear sprocket assembly.

In accordance with an eleventh aspect of the present invention, the bicycle rear sprocket assembly according to any one of the first to tenth aspects is configured so that the at least one sprocket includes a first sprocket. The first sprocket includes a first sprocket body and a plurality of first sprocket teeth extending radially outwardly from the first sprocket body relative to a rotational center axis of the bicycle rear sprocket assembly. The first sprocket includes the plurality of internal spline teeth extending radially inwardly from the first sprocket body.

With the bicycle rear sprocket assembly according to the eleventh aspect, the plurality of internal spline teeth of the first sprocket improves a torque transmission performance of the bicycle rear sprocket assembly.

In accordance with a twelfth aspect of the present invention, the bicycle rear sprocket assembly according to the eleventh aspect is configured so that the first sprocket has a pitch-circle diameter larger than the maximum outer diameter of the internal cavity.

With the bicycle rear sprocket assembly according to the twelfth aspect, it is possible to utilize the first sprocket as lower gear in the bicycle rear sprocket assembly.

In accordance with a thirteenth aspect of the present invention, the bicycle rear sprocket assembly according to the twelfth aspect is configured so that the pitch-circle diameter of the first sprocket is the largest pitch-circle diameter in the bicycle rear sprocket assembly.

With the bicycle rear sprocket assembly according to the thirteenth aspect, it is possible to utilize the first sprocket as low gear in the bicycle rear sprocket assembly.

In accordance with a fourteenth aspect of the present invention, the bicycle rear sprocket assembly according to the eleventh aspect is configured so that the at least one sprocket includes a second sprocket. The second sprocket includes a second sprocket body and a plurality of second sprocket teeth extending radially outwardly from the second sprocket body relative to the rotational center axis. The internal cavity is provided radially inwardly of the second sprocket body.

With the bicycle rear sprocket assembly according to the fourteenth aspect, it is possible to utilize a radially inner area of the second sprocket as the internal cavity.

In accordance with a fifteenth aspect of the present invention, the bicycle rear sprocket assembly according to the fourteenth aspect is configured so that the first sprocket is a separate member from the second sprocket.

With the bicycle rear sprocket assembly according to the fifteenth aspect, it is possible to improve a degree of freedom of designing the first sprocket and the second sprocket.

In accordance with a sixteenth aspect of the present invention, the bicycle rear sprocket assembly according to the fifteenth aspect further comprises a coupling member coupling the first sprocket to the second sprocket.

With the bicycle rear sprocket assembly according to the sixteenth aspect, it is possible to improve coupling strength between the first sprocket and the second sprocket with the coupling member. This improves strength of the bicycle rear sprocket assembly with saving the weight of the bicycle rear sprocket assembly.

In accordance with a seventeenth aspect of the present invention, the bicycle rear sprocket assembly according to the sixteenth aspect is configured so that the coupling member is integrally provided with at least one of the first sprocket and the second sprocket as a one-piece unitary member.

With the bicycle rear sprocket assembly according to the seventeenth aspect, it is possible to easily manufacture the coupling member.

In accordance with an eighteenth aspect of the present invention, the bicycle rear sprocket assembly according to the seventeenth aspect is configured so that the coupling member includes at least one coupling pin.

With the bicycle rear sprocket assembly according to the eighteenth aspect, it is possible to easily manufacture the coupling member.

In accordance with a nineteenth aspect of the present invention, the bicycle rear sprocket assembly according to any one of the fourteenth to eighteenth aspects is configured so that the plurality of first sprocket teeth and the plurality of second sprocket teeth are integrally provided with each other as a one-piece unitary member.

With the bicycle rear sprocket assembly according to the nineteenth aspect, it is possible to improve coupling strength between the first sprocket and the second sprocket with the coupling member. This improves strength of the bicycle rear sprocket assembly with saving the weight of the bicycle rear sprocket assembly.

In accordance with a twentieth aspect of the present invention, the bicycle rear sprocket assembly according to any one of the first to nineteenth aspects is configured so that the at least ten internal spline teeth have an internal-spline minor diameter. The maximum outer diameter of the internal cavity is larger than the internal-spline minor diameter.

With the bicycle rear sprocket assembly according to the twentieth aspect, it is possible to enlarge the internal cavity.

In accordance with a twenty-first aspect of the present invention, the bicycle rear sprocket assembly according to any one of the first to twentieth aspects is configured so that at least one of the at least one sprocket includes a sprocket body and a plurality of sprocket teeth extending radially outwardly from the sprocket body relative to a rotational center axis of the bicycle rear sprocket assembly. The plurality of sprocket teeth includes at least one first tooth and at least one second tooth. The at least one first tooth has a first maximum axial width defined in an axial direction relative to the rotational center axis. The at least one second tooth has a second maximum axial width defined in the axial direction. The first maximum axial width is larger than the second maximum axial width.

With the bicycle rear sprocket assembly according to the twenty-first aspect, the at least one first tooth improves chain-holding performance of the bicycle rear sprocket assembly.

In accordance with a twenty-second aspect of the present invention, a bicycle rear sprocket assembly comprises at least one sprocket. The at least one sprocket includes at least ten internal spline teeth configured to engage with a bicycle hub assembly. The at least ten internal spline teeth have an internal-spline major diameter. At least one of the at least one sprocket includes a sprocket body and a plurality of sprocket teeth extending radially outwardly from the sprocket body relative to a rotational center axis of the bicycle rear sprocket assembly. The plurality of sprocket teeth includes at least one first tooth and at least one second tooth. The at least one first tooth has a first maximum axial width defined in an axial direction relative to the rotational center axis. The at least one second tooth has a second maximum axial width defined in the axial direction. The first maximum axial width being larger than the second maximum axial width.

With the bicycle rear sprocket assembly according to the twenty-second aspect, the at least ten internal spline teeth reduce a rotational force applied to each of the at least ten internal spline teeth in comparison with a sprocket including nine or less internal spline teeth. This improves durability of the at least one sprocket and/or improves a degree of freedom of choosing a material of the at least one sprocket without reducing durability of the at least one sprocket. Furthermore, the at least one first tooth improves chain-holding performance of the bicycle rear sprocket assembly.

In accordance with a twenty-third aspect of the present invention, the bicycle rear sprocket assembly according to any one of the first to twenty-second aspects is configured so that the at least one sprocket includes a smallest sprocket including at least one sprocket tooth. A total number of the at least one sprocket tooth of the smallest sprocket is equal to or smaller than 10.

With the bicycle rear sprocket assembly according to the twenty-third aspect, it is possible to widen the gear range of the bicycle rear sprocket assembly on a top gear side.

In accordance with a twenty-fourth aspect of the present invention, the bicycle rear sprocket assembly according to any one of the first to twenty-third aspect is configured so that the at least one sprocket includes a largest sprocket including at least one sprocket tooth. A total number of the at least one sprocket tooth of the largest sprocket is equal to or larger than 46.

With the bicycle rear sprocket assembly according to the twenty-fourth aspect, it is possible to widen the gear range of the bicycle rear sprocket assembly on a low gear side.

In accordance with a second aspect of the present invention, the bicycle rear sprocket assembly according to the twenty-fourth aspect is configured so that the total number of the at least one sprocket tooth of the largest sprocket is equal to or larger than 50.

With the bicycle rear sprocket assembly according to the twenty-fifth aspect, it is possible to further widen the gear range of the bicycle rear sprocket assembly on a low gear side.

In accordance with a twenty-sixth aspect of the present invention, the bicycle rear sprocket assembly according to any one of the first to twenty-fifth aspects is configured so that a total number of the at least one sprocket is equal to or larger than 11.

With the bicycle rear sprocket assembly according to the twenty-sixth aspect, it is possible to widen the entire gear range of the bicycle rear sprocket assembly.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
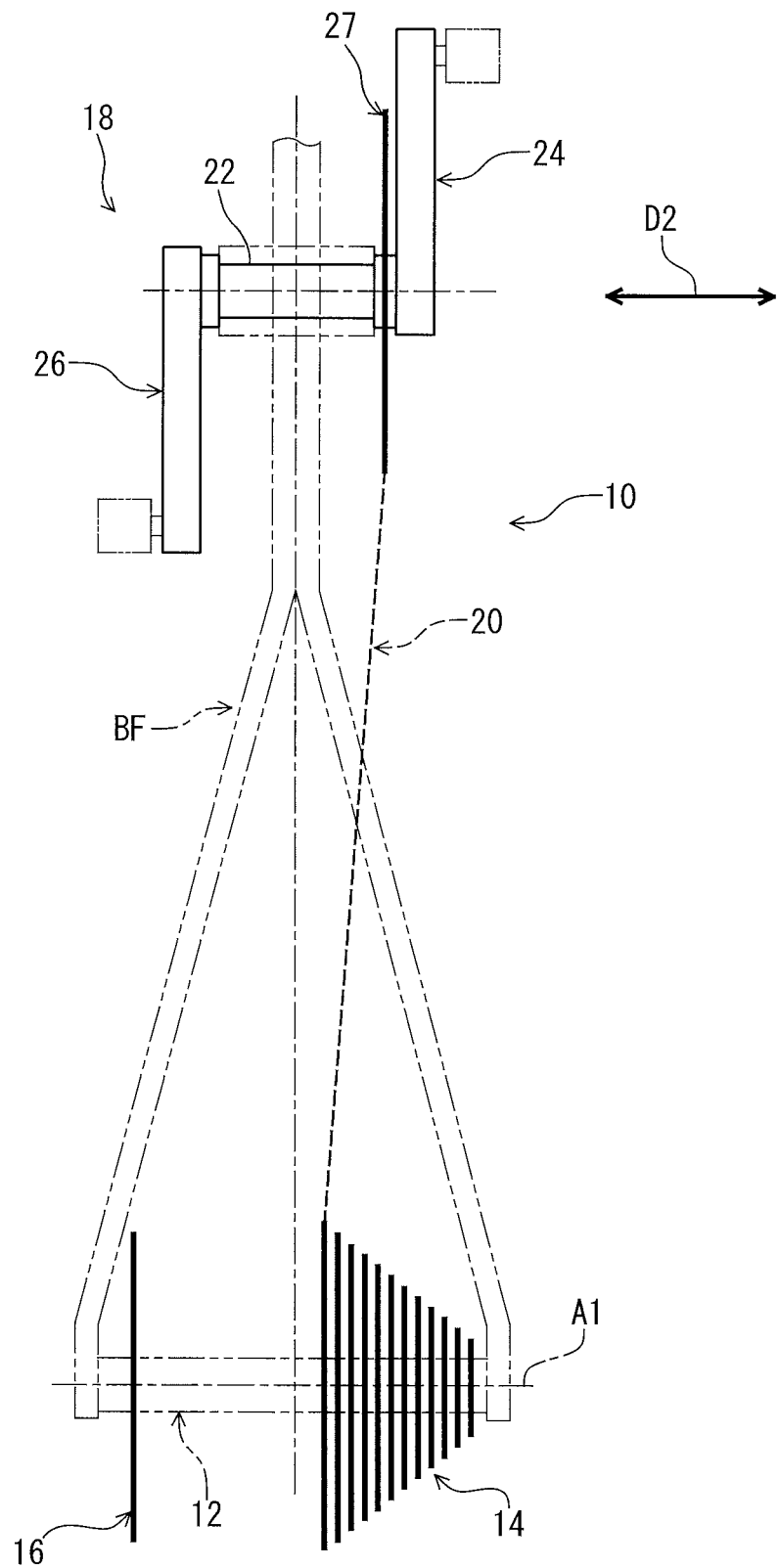
FIG. 1 is a schematic diagram of a bicycle drive train including a bicycle rear sprocket assembly in accordance with a first embodiment.

The embodiment(s) will now be described with reference to the accompanying drawings, wherein like reference numerals designate corresponding or identical elements throughout the various drawings.

First Embodiment

Referring initially to FIG. 1, a bicycle drive train 10 comprises a bicycle hub assembly 12 and a bicycle rear sprocket assembly 14 in accordance with a first embodiment. The bicycle hub assembly 12 is secured to a bicycle frame BF. The bicycle rear sprocket assembly 14 is mounted on the bicycle hub assembly 12. A bicycle brake rotor 16 is mounted on the bicycle hub assembly 12.

The bicycle drive train 10 further comprises a crank assembly 18 and a bicycle chain 20. The crank assembly 18 includes a crank axle 22, a right crank arm 24, a left crank arm 26, and a front sprocket 27. The right crank arm 24 and the left crank arm 26 are secured to the crank axle 22. The front sprocket 27 is secured to at least one of the crank axle 22 and the right crank arm 24. The bicycle chain 20 is engaged with the front sprocket 27 and the bicycle rear sprocket assembly 14 to transmit a pedaling force from the front sprocket 27 to the bicycle rear sprocket assembly 14. The crank assembly 18 includes the front sprocket 27 as a single sprocket in the illustrated embodiment. However, the crank assembly 18 can includes a plurality of front sprockets. The bicycle rear sprocket assembly 14 is a rear sprocket assembly. However, structures of the bicycle rear sprocket assembly 14 can be applied to the front sprocket.

In the present application, the following directional terms "front," "rear," "forward," "rearward," "left," "right," "transverse," "upward" and "downward" as well as any other similar directional terms refer to those directions which are determined on the basis of a user (e.g., a rider) who sits on a saddle (not shown) of a bicycle with facing a handlebar (not shown). Accordingly, these terms, as utilized to describe the bicycle drive train 10, the bicycle hub assembly 12, or the bicycle rear sprocket assembly 14, should be interpreted relative to the bicycle equipped with the bicycle drive train 10, the bicycle hub assembly 12, or the bicycle rear sprocket assembly 14 as used in an upright riding position on a horizontal surface.

Figure 2:
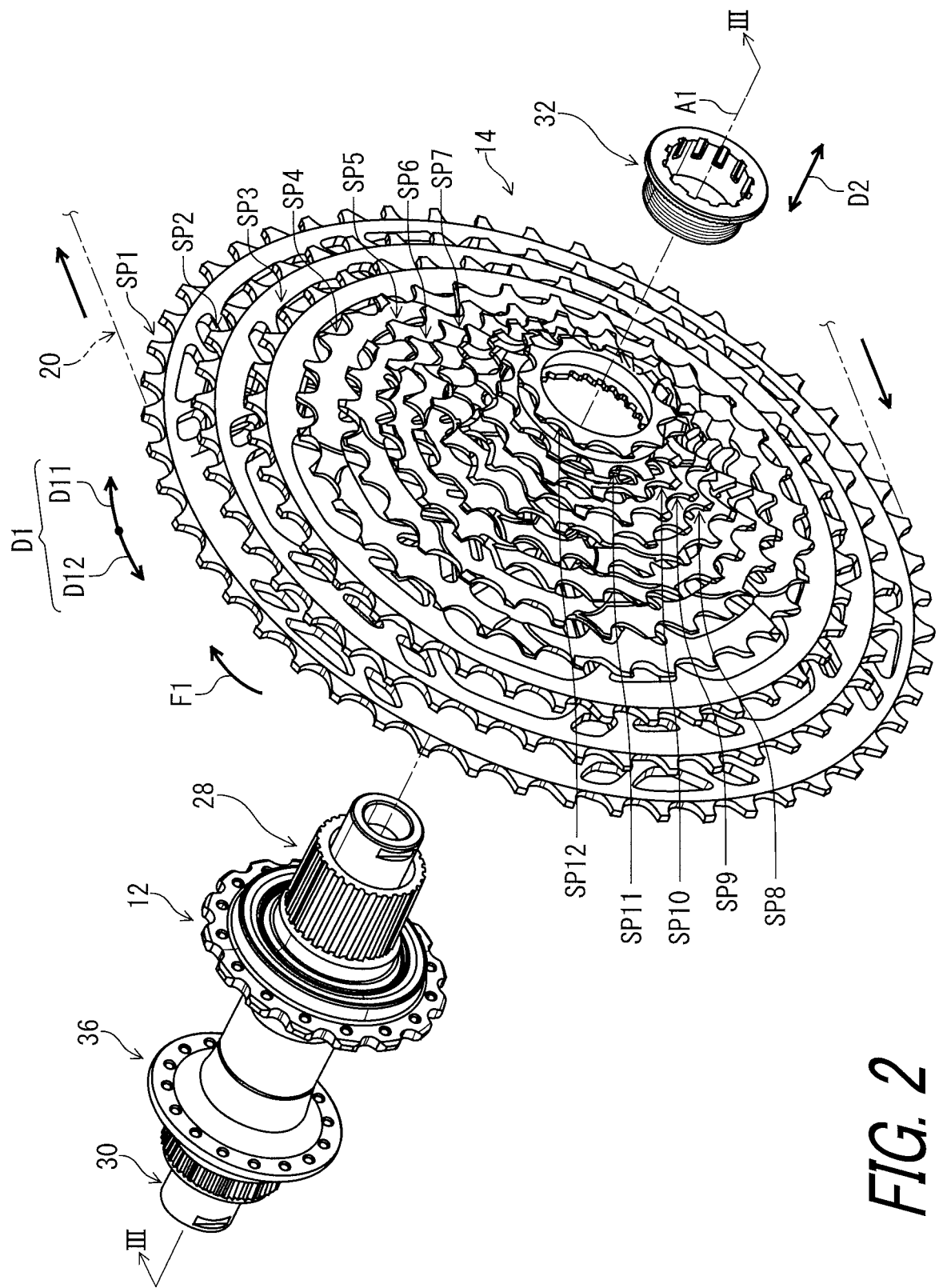
FIG. 2 is an exploded perspective view of the bicycle drive train illustrated in FIG. 1.

As seen in FIG. 2, the bicycle hub assembly 12 and the bicycle rear sprocket assembly 14 have a rotational center axis A1. The bicycle rear sprocket assembly 14 is rotatably supported by the bicycle hub assembly 12 relative to the bicycle frame BF (FIG. 1) about the rotational center axis A1. The bicycle rear sprocket assembly 14 is configured to be engaged with the bicycle chain 20 to transmit a driving rotational force F1 between the bicycle chain 20 and the bicycle rear sprocket assembly 14 during pedaling. The bicycle rear sprocket assembly 14 is rotated about the rotational center axis A1 in a driving rotational direction D11 during pedaling. The driving rotational direction D11 is defined along a circumferential direction D1 of the bicycle hub assembly 12 or the bicycle rear sprocket assembly 14. A reverse rotational direction D12 is an opposite direction of the driving rotational direction D11 and is defined along the circumferential direction D1.

As seen in FIG. 2, the bicycle hub assembly 12 comprises a sprocket support body 28. The bicycle rear sprocket assembly 14 is configured to be mounted to the sprocket support body 28 of the bicycle hub assembly 12. The bicycle rear sprocket assembly 14 is mounted on the sprocket support body 28 to transmit the driving rotational force F1 between the sprocket support body 28 and the bicycle rear sprocket assembly 14. The bicycle hub assembly 12 comprises a hub axle 30. The sprocket support body 28 is rotatably mounted on the hub axle 30 about the rotational center axis A1. The bicycle rear sprocket assembly 14 further comprises a lock member 32. The lock member 32 is secured to the sprocket support body 28 to hold the bicycle rear sprocket assembly 14 relative to the sprocket support body 28 in an axial direction D2 parallel to the rotational center axis A1.

Figure 3:
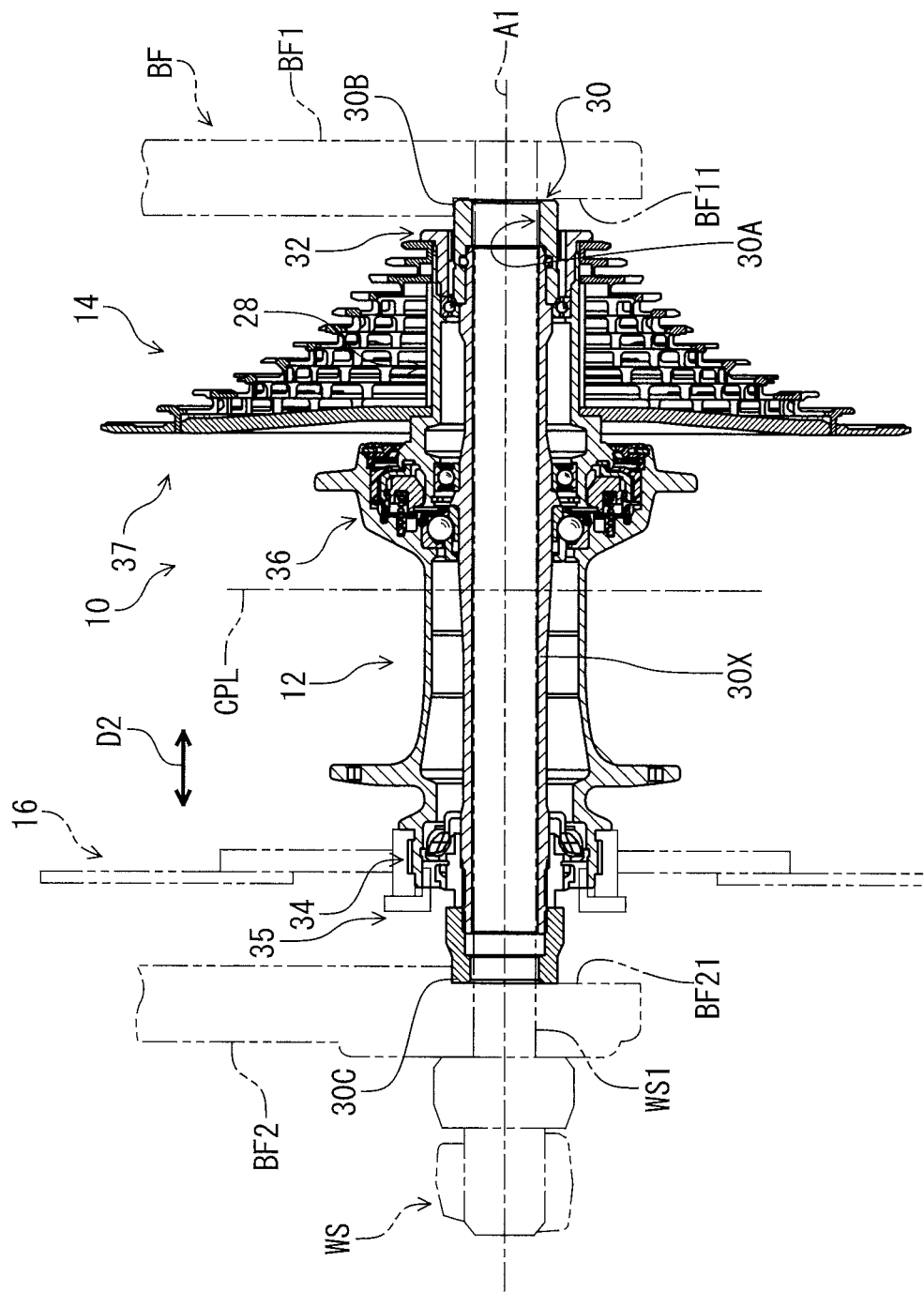
FIG. 3 is a cross-sectional view of the bicycle drive train taken along line III-III of FIG. 2.

As seen in FIG. 3, the bicycle hub assembly 12 is secured to the bicycle frame BF with a wheel securing structure WS. The hub axle 30 includes an axle through-bore 30A. A securing rod WS1 of the wheel securing structure WS extends through the axle through-bore 30A of the hub axle 30. The hub axle 30 includes a first axle end 30B and a second axle end 30C. The hub axle 30 extends between the first axle end 30B and the second axle end 30C along the rotational center axis A1. The first axle end 30B is provided in a first recess BF11 of a first frame BF1 of the bicycle frame BF. The second axle end 30C is provided in a second recess BF21 of a second frame BF2 of the bicycle frame BF. The hub axle 30 is held between the first frame BF1 and the second frame BF2 with the wheel securing structure WS. The wheel securing structure WS includes a structure which has been known in the bicycle filed. Thus, it will not be described in detail here for the sake of brevity.

Figure 4:
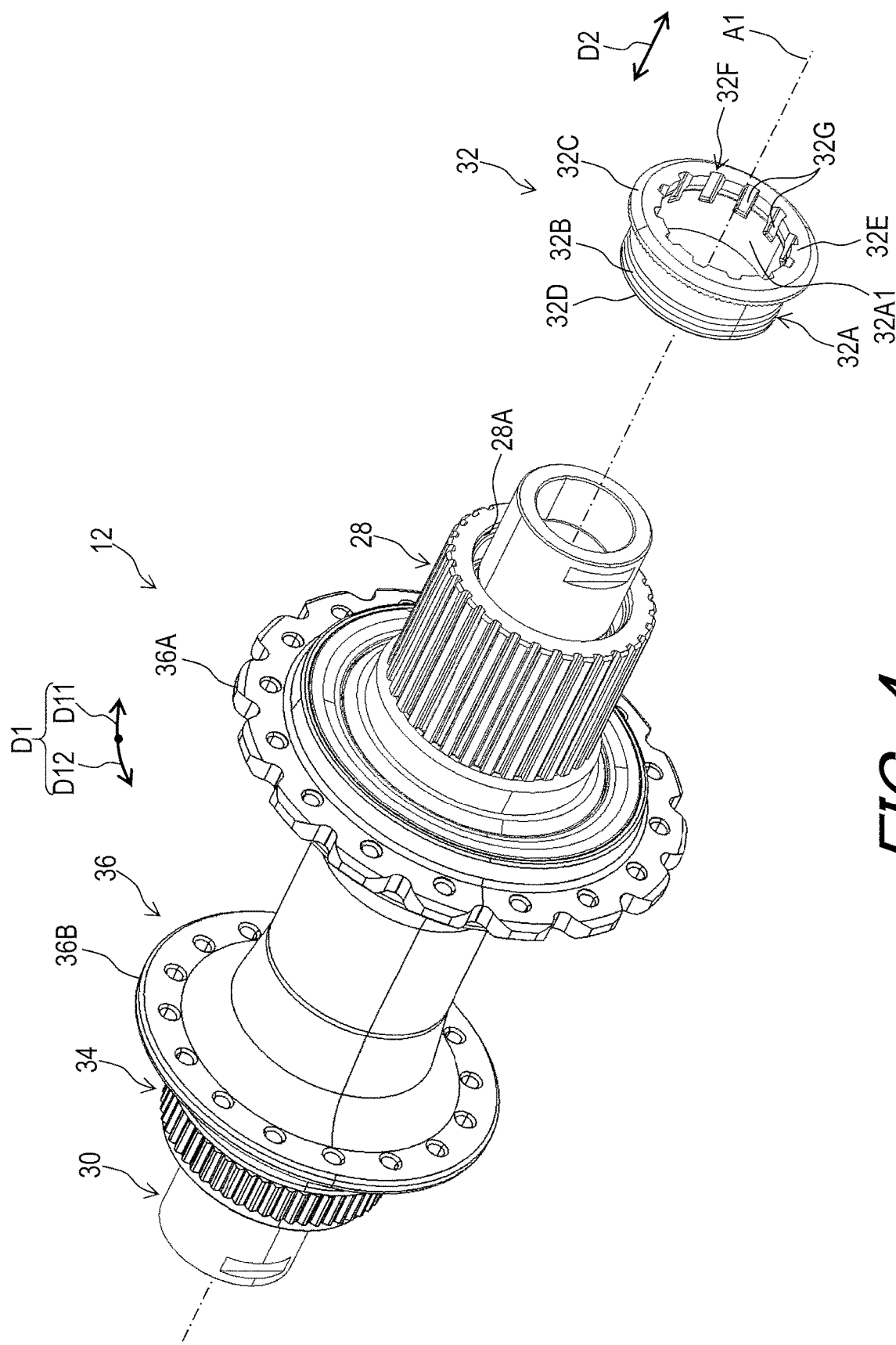
FIG. 4 is a perspective view of a bicycle hub assembly of the bicycle drive train illustrated in FIG. 2, with a lock member of the bicycle rear sprocket assembly.

As seen in FIGS. 3 and 4, the bicycle hub assembly 12 further comprises a brake-rotor support body 34. The brake-rotor support body 34 is rotatably mounted on the hub axle 30 about the rotational center axis A1. As seen in FIG. 3, the brake-rotor support body 34 is coupled to the bicycle brake rotor 16 (FIG. 3) to transmit a braking rotational force from the bicycle brake rotor 16 to the brake-rotor support body 34. The bicycle brake rotor 16 is secured to the brake-rotor support body 34 with a rotor lock member 35.

As seen in FIG. 4, the bicycle hub assembly 12 comprises a hub body 36. The hub body 36 is rotatably mounted on the hub axle 30 about the rotational center axis A1 of the bicycle hub assembly 12. In this embodiment, the sprocket support body 28 is a separate member from the hub body 36. The brake-rotor support body 34 is integrally provided with the hub body 36 as a one-piece unitary member. However, the sprocket support body 28 can be integrally provided with the hub body 36. The brake-rotor support body 34 can be a separate member from the hub body 36. For example, the hub body 36 is made of a metallic material including aluminum.

Figure 5:
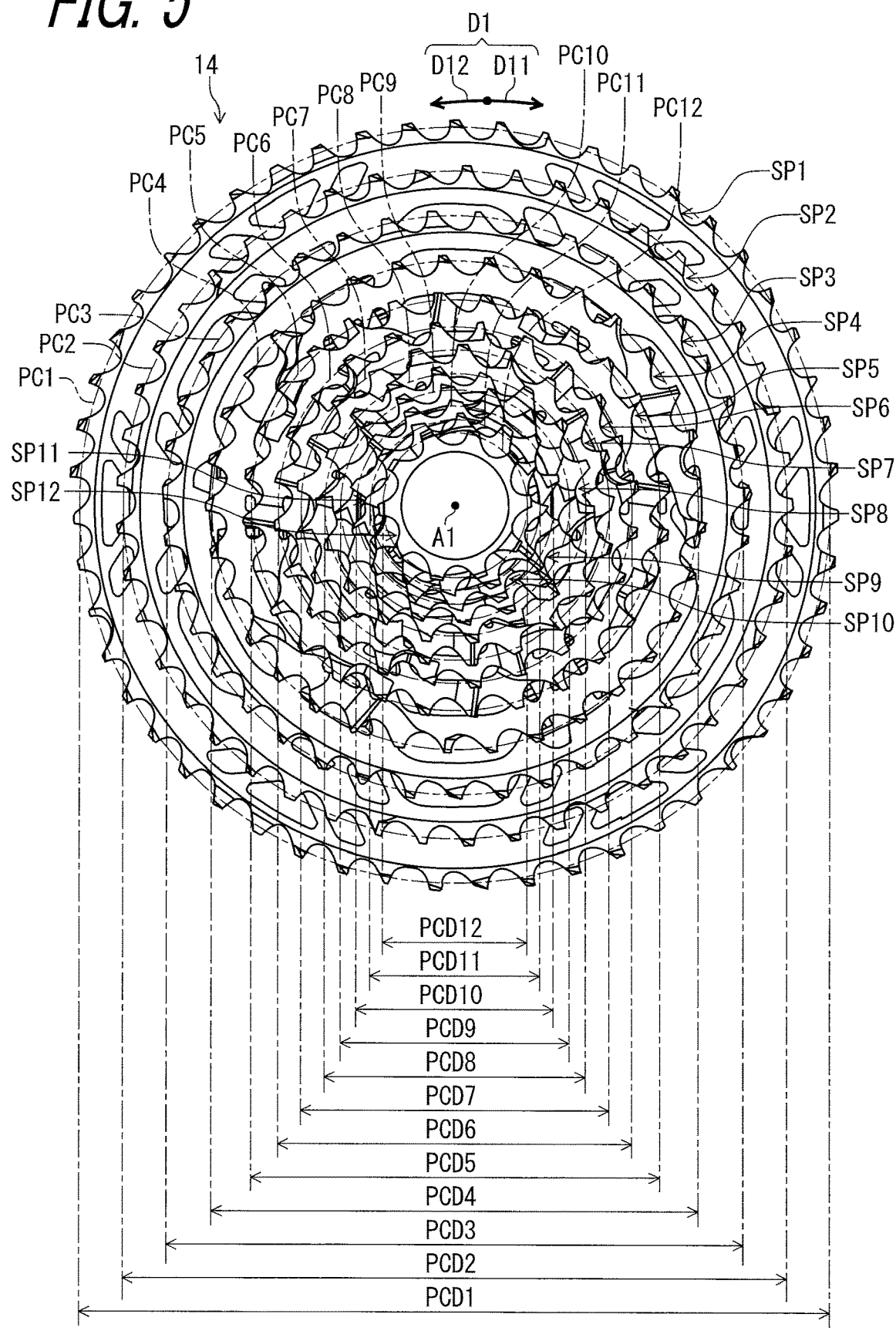
FIG. 5 is a side elevational view of the bicycle rear sprocket assembly of the bicycle drive train illustrated in FIG. 2.

As seen in FIG. 5, the bicycle rear sprocket assembly 14 comprises at least one sprocket. The bicycle rear sprocket assembly 14 comprises a plurality of bicycle sprockets SP1 to SP12. In this embodiment, the at least one sprocket includes a first sprocket SP1. The at least one sprocket includes a second sprocket SP2. In this embodiment, the at least one sprocket further includes third to twelfth sprockets SP3 to SP12. The first sprocket SP1 is a separate member from the second sprocket SP2. The second to twelfth sprockets SP2 to SP12 are integrally provided with each other as a one-piece unitary member. However, at least one of the second to twelfth sprockets SP2 to SP12 can be a separate member from another of the second to twelfth sprockets SP2 to SP12. In this embodiment, the first to twelfth sprockets SP1 to SP12 are made of a metallic material such as aluminum, iron, or titanium. However, at least one of the first to twelfth sprockets SP1 to SP12 can be made of a non-metallic material.

For example, a total number of the at least one sprocket is equal to or larger than 11. In this embodiment, the total number of the sprockets is 12. However, the total number of the sprockets is not limited to this embodiment. For example, the total number of the sprockets can be equal to or larger than 13.

In this embodiment, the at least one sprocket includes a largest sprocket. The at least one sprocket includes a smallest sprocket. The first sprocket SP1 can also be referred to as a largest sprocket SP1. The twelfth sprocket SP12 can also be referred to as a smallest sprocket SP12. The first sprocket SP1 corresponds to low gear in the bicycle rear sprocket assembly 14. The twelfth sprocket SP12 corresponds to top gear in the bicycle rear sprocket assembly 14. However, the first sprocket SP1 can correspond to another gear in the bicycle rear sprocket assembly 14. The twelfth sprocket SP12 can correspond to another gear in the bicycle rear sprocket assembly 14.

As seen in FIG. 5, the first sprocket SP1 has a pitch-circle diameter PCD1. The second sprocket SP2 has a pitch-circle diameter PCD2. The third sprocket SP3 has a pitch-circle diameter PCD3. The fourth sprocket SP4 has a pitch-circle diameter PCD4. The fifth sprocket SP5 has a pitch-circle diameter PCD5. The sixth sprocket SP6 has a pitch-circle diameter PCD6. The seventh sprocket SP7 has a pitch-circle diameter PCD7. The eighth sprocket SP8 has a pitch-circle diameter PCD8. The ninth sprocket SP9 has a pitch-circle diameter PCD9. The tenth sprocket SP10 has a pitch-circle diameter PCD10. The eleventh sprocket SP11 has a pitch-circle diameter PCD11. The twelfth sprocket SP12 has a pitch-circle diameter PCD12.

The first sprocket SP1 has a pitch circle PC1 having the pitch-circle diameter PCD1. The second sprocket SP2 has a pitch circle PC2 having the pitch-circle diameter PCD2. The third sprocket SP3 has a pitch circle PC3 having the pitch-circle diameter PCD3. The fourth sprocket SP4 has a pitch circle PC4 having the pitch-circle diameter PCD4. The fifth sprocket SP5 has a pitch circle PC5 having the pitch-circle diameter PCD5. The sixth sprocket SP6 has a pitch circle PC6 having the pitch-circle diameter PCD6. The seventh sprocket SP7 has a pitch circle PC7 having the pitch-circle diameter PCD7. The eighth sprocket SP8 has a pitch circle PC8 having the pitch-circle diameter PCD8. The ninth sprocket SP9 has a pitch circle PC9 having the pitch-circle diameter PCD9. The tenth sprocket SP10 has a pitch circle PC10 having the pitch-circle diameter PCD10. The eleventh sprocket SP11 has a pitch circle PC11 having the pitch-circle diameter PCD11. The twelfth sprocket SP12 has a pitch circle PC12 having the pitch-circle diameter PCD12.

For example, the pitch circle PC1 of the first sprocket SP1 is defined by center axes of pins of the bicycle chain 20 (FIG. 2) engaged with the first sprocket SP1. The pitch circles PC2 to PC12 are defined as well as the pitch circle PC1. Thus, they will not be descried in detail here for the sake of brevity.

In this embodiment, the pitch-circle diameter PCD1 is larger than the pitch-circle diameter PCD2. The pitch-circle diameter PCD2 is larger than the pitch-circle diameter PCD3. The pitch-circle diameter PCD3 is larger than the pitch-circle diameter PCD4. The pitch-circle diameter PCD4 is larger than the pitch-circle diameter PCD5. The pitch-circle diameter PCD5 is larger than the pitch-circle diameter PCD6. The pitch-circle diameter PCD6 is larger than the pitch-circle diameter PCD7. The pitch-circle diameter PCD7 is larger than the pitch-circle diameter PCD8. The pitch-circle diameter PCD8 is larger than the pitch-circle diameter PCD9. The pitch-circle diameter PCD9 is larger than the pitch-circle diameter PCD10. The pitch-circle diameter PCD10 is larger than the pitch-circle diameter PCD11. The pitch-circle diameter PCD11 is larger than the pitch-circle diameter PCD12.

The pitch-circle diameter PCD1 of the first sprocket SP1 is the largest pitch-circle diameter in the bicycle rear sprocket assembly 14. The pitch-circle diameter PCD12 of the twelfth sprocket SP12 is the smallest pitch-circle diameter in the bicycle rear sprocket assembly 14. However, the pitch-circle diameter PCD1 of the first sprocket SP1 is not limited to the largest pitch-circle diameter in the bicycle rear sprocket assembly 14. The pitch-circle diameter PCD12 of the twelfth sprocket SP12 is not limited to the smallest pitch-circle diameter in the bicycle rear sprocket assembly 14.

Figure 6:
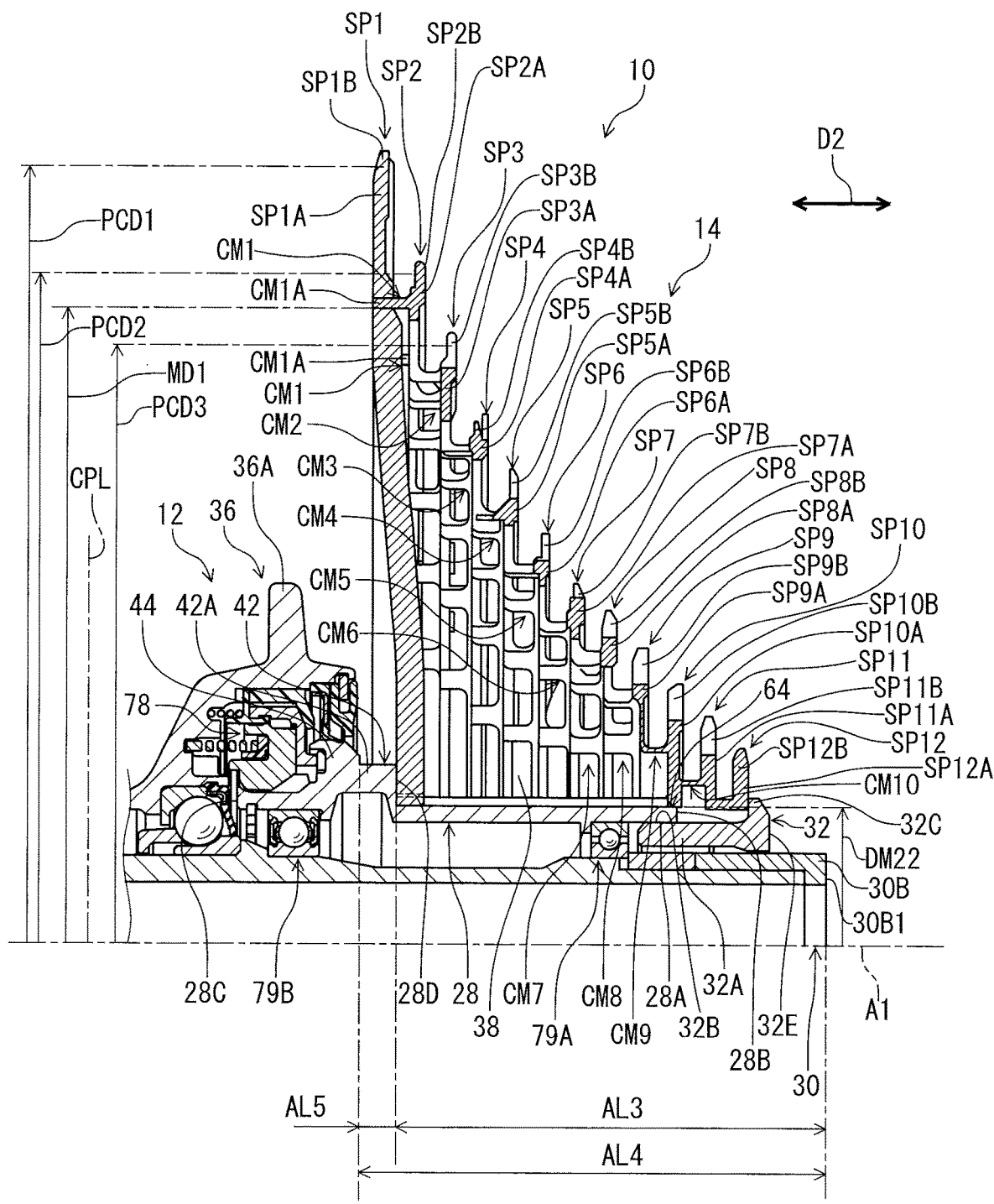
FIG. 6 is an enlarged cross-sectional view of the bicycle drive train illustrated in FIG. 4.

As seen in FIG. 6, the second sprocket SP2 is adjacent to the first sprocket SP1 without another sprocket between the first sprocket SP1 and the second sprocket SP2 in the axial direction D2 with respect to the rotational center axis A1 of the bicycle rear sprocket assembly 14. The third sprocket SP3 is adjacent to the second sprocket SP2 without another sprocket between the second sprocket SP2 and the third sprocket SP3 in the axial direction D2 with respect to the rotational center axis A1 of the bicycle rear sprocket assembly 14. The fourth sprocket SP4 is adjacent to the third sprocket SP3 without another sprocket between the third sprocket SP3 and the fourth sprocket SP4 in the axial direction D2 with respect to the rotational center axis A1 of the bicycle rear sprocket assembly 14. The first sprocket SP1 to twelfth sprockets SP1 to SP12 are arranged in the axial direction D2 in this order.

Figure 7:
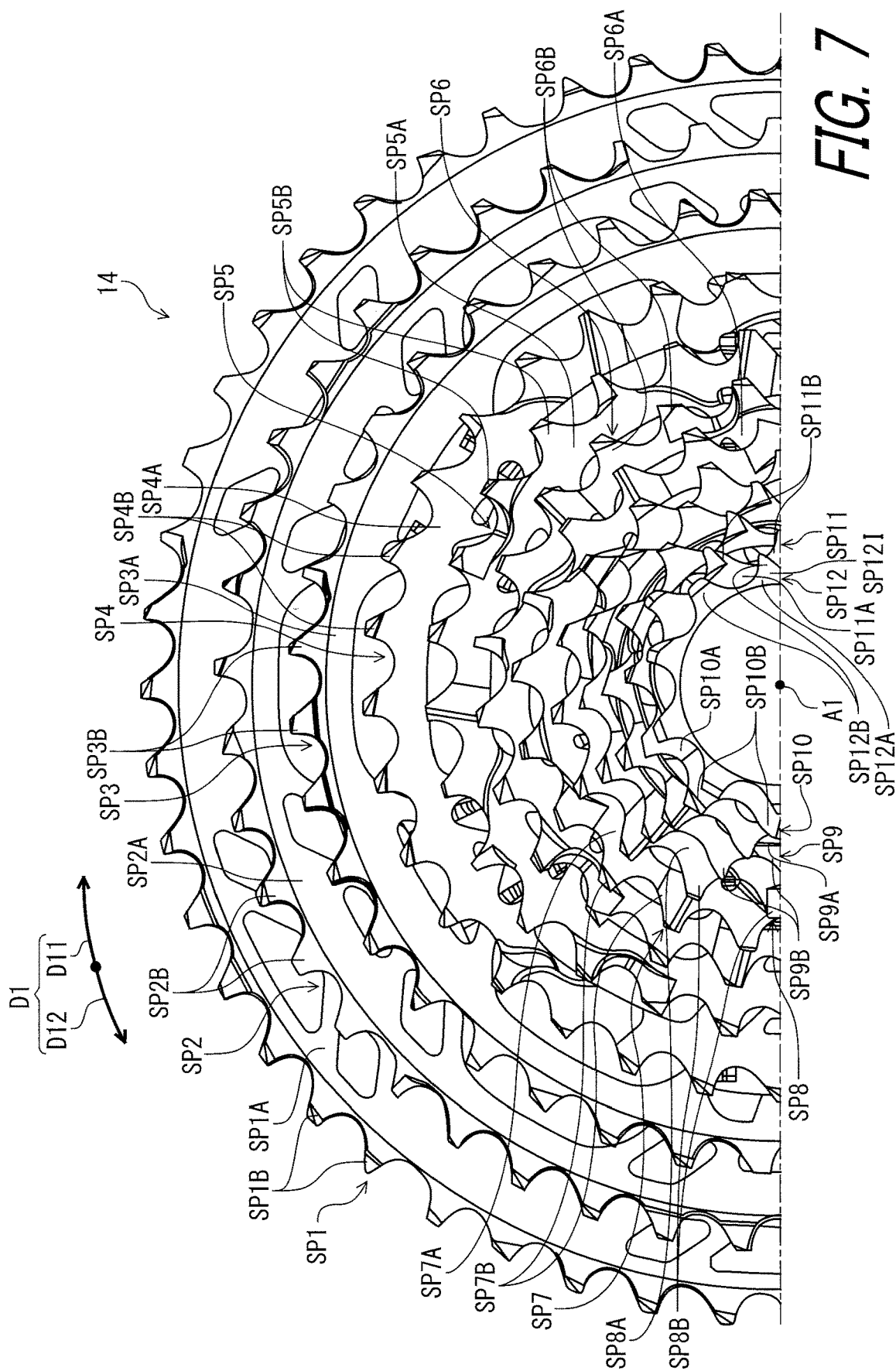
FIG. 7 is a partial side elevational view of the bicycle rear sprocket assembly of the bicycle drive train illustrated in FIG. 2.

As seen in FIG. 7, at least one of the at least one sprocket includes a sprocket body and a plurality of sprocket teeth extending radially outwardly from the sprocket body relative to the rotational center axis A1 of the bicycle rear sprocket assembly 14.

The largest sprocket SP1 includes at least one sprocket tooth SP1B. The first sprocket SP1 includes a first sprocket body SP1A and a plurality of first sprocket teeth SP1B. The plurality of first sprocket teeth SP1B extends radially outwardly from the first sprocket body SP1A relative to the rotational center axis A1 of the bicycle rear sprocket assembly 14. The first sprocket tooth SP1B can also be referred to as a sprocket tooth SP1B. A total number of the at least one sprocket tooth SP1B of the largest sprocket SP1 is equal to or larger than 46. The total number of the at least one sprocket tooth SP1B of the largest sprocket SP1 is equal to or larger than 50. In this embodiment, the total number of the at least one sprocket tooth SP1B of the first sprocket SP1 is 51. However, the total number of the plurality of sprocket tooth SP1B of the first sprocket SP1 is not limited to this embodiment and the above range.

The second sprocket SP2 includes a second sprocket body SP2A and a plurality of second sprocket teeth SP2B. The plurality of second sprocket teeth SP2B extends radially outwardly from the second sprocket body SP2A relative to the rotational center axis A1. In this embodiment, a total number of the plurality of second sprocket teeth SP2B is 45. However, the total number of the plurality of second sprocket teeth SP2B of the second sprocket SP2 is not limited to this embodiment.

The third sprocket SP3 includes a third sprocket body SP3A and a plurality of third sprocket teeth SP3B. The plurality of third sprocket teeth SP3B extends radially outwardly from the third sprocket body SP3A with respect to the rotational center axis A1 of the bicycle rear sprocket assembly 14. In this embodiment, a total number of the plurality of third sprocket teeth SP3B is 39. However, the total number of the plurality of third sprocket teeth SP3B of the third sprocket SP3 is not limited to this embodiment.

The fourth sprocket SP4 includes a fourth sprocket body SP4A and a plurality of fourth sprocket teeth SP4B. The plurality of fourth sprocket teeth SP4B extends radially outwardly from the fourth sprocket body SP4A with respect to the rotational center axis A1 of the bicycle rear sprocket assembly 14. In this embodiment, a total number of the plurality of fourth sprocket teeth SP4B is 33. However, the total number of the plurality of fourth sprocket teeth SP4B of the fourth sprocket SP4 is not limited to this embodiment.

The fifth sprocket SP5 includes a fifth sprocket body SP5A and a plurality of fifth sprocket teeth SP5B. The plurality of fifth sprocket teeth SP5B extends radially outwardly from the fifth sprocket body SP5A with respect to the rotational center axis A1 of the bicycle rear sprocket assembly 14. In this embodiment, a total number of the plurality of sprocket teeth SP5B is 28. However, the total number of the plurality of fifth sprocket teeth SP5B of the fifth sprocket SP5 is not limited to this embodiment.

The sixth sprocket SP6 includes a sixth sprocket body SP6A and a plurality of sixth sprocket teeth SP6B. The plurality of sixth sprocket teeth SP6B extends radially outwardly from the sixth sprocket body SP6A with respect to the rotational center axis A1 of the bicycle rear sprocket assembly 14. In this embodiment, a total number of the plurality of sixth sprocket teeth SP6B is 24. However, the total number of the plurality of sixth sprocket teeth SP6B of the sixth sprocket SP6 is not limited to this embodiment.

The seventh sprocket SP7 includes a seventh sprocket body SP7A and a plurality of seventh sprocket teeth SP7B. The plurality of seventh sprocket teeth SP7B extends radially outwardly from the seventh sprocket body SP7A with respect to the rotational center axis A1 of the bicycle rear sprocket assembly 14. In this embodiment, a total number of the plurality of sprocket teeth SP7B is 21. However, the total number of the plurality of seventh sprocket teeth SP7B of the seventh sprocket SP7 is not limited to this embodiment.

The eighth sprocket SP8 includes an eighth sprocket body SP8A and a plurality of eighth sprocket teeth SP8B. The plurality of eighth sprocket teeth SP8B extends radially outwardly from the eighth sprocket body SP8A with respect to the rotational center axis A1 of the bicycle rear sprocket assembly 14. In this embodiment, a total number of the plurality of eighth sprocket teeth SP8B is 18. However, the total number of the plurality of eighth sprocket teeth SP8B of the eighth sprocket SP8 is not limited to this embodiment.

The ninth sprocket SP9 includes a ninth sprocket body SP9A and a plurality of ninth sprocket teeth SP9B. The plurality of ninth sprocket teeth SP9B extends radially outwardly from the ninth sprocket body SP9A with respect to the rotational center axis A1 of the bicycle rear sprocket assembly 14. In this embodiment, a total number of the plurality of ninth sprocket teeth SP9B is 16. However, the total number of the plurality of ninth sprocket teeth SP9B of the ninth sprocket SP9 is not limited to this embodiment.

The tenth sprocket SP10 includes a tenth sprocket body SP10A and a plurality of tenth sprocket teeth SP10B. The plurality of tenth sprocket teeth SP extends radially outwardly from the tenth sprocket body SP10A with respect to the rotational center axis A1 of the bicycle rear sprocket assembly 14. In this embodiment, a total number of the plurality of sprocket teeth SP is 14. However, the total number of the plurality of tenth sprocket teeth SP10B of the tenth sprocket SP10 is not limited to this embodiment.

The eleventh sprocket SP11 includes an eleventh sprocket body SP11A and a plurality of eleventh sprocket teeth SP11B. The plurality of eleventh sprocket teeth SP11B extends radially outwardly from the eleventh sprocket body SP11A with respect to the rotational center axis A1 of the bicycle rear sprocket assembly 14. In this embodiment, a total number of the plurality of sprocket teeth SP11B is 12. However, the total number of the plurality of eleventh sprocket teeth SP11B of the eleventh sprocket SP11 is not limited to this embodiment.

The smallest sprocket SP12 includes at least one sprocket tooth SP12B. The twelfth sprocket SP12 includes a twelfth sprocket body SP12A and a plurality of twelfth sprocket teeth SP12B. The plurality of twelfth sprocket teeth SP12B extends radially outwardly from the twelfth sprocket body SP12A with respect to the rotational center axis A1 of the bicycle rear sprocket assembly 14. The twelfth sprocket tooth SP12B can also be referred to as a sprocket tooth SP12B. A total number of the at least one sprocket tooth SP12B of the smallest sprocket SP12 is equal to or smaller than 10. In this embodiment, the total number of the at least one sprocket tooth SP12B is 10. However, the total number of the at least one sprocket tooth SP12B of the twelfth sprocket SP12 is not limited to this embodiment.

As seen in FIG. 6, the bicycle rear sprocket assembly 14 comprises an internal cavity 38. The internal cavity 38 is provided radially inwardly of the second sprocket body SP2A. The internal cavity 38 is provided radially inwardly of the third to twelfth sprocket bodies SP3A to SP12A. However, the position of the internal cavity 38 is not limited to this embodiment. The internal cavity 38 has a maximum outer diameter MD1. The pitch-circle diameter PCD1 of the first sprocket SP1 is larger than the maximum outer diameter MD1 of the internal cavity 38. The pitch-circle diameter PCD2 of the second sprocket SP2 is larger than the maximum outer diameter MD1 of the internal cavity 38. The pitch-circle diameter PCD3 of the third sprocket SP3 is smaller than the maximum outer diameter MD1 of the internal cavity 38. However, the dimensional relationship between the maximum outer diameter MD1 of the internal cavity 38 and each of the pitch-circle diameters PCD1 to PCD12 of the sprockets SP1 to SP12 is not limited to this embodiment.

The bicycle rear sprocket assembly 14 further comprises a coupling member CM1 coupling the first sprocket SP1 to the second sprocket SP2. The coupling member CM1 is integrally provided with at least one of the first sprocket SP1 and the second sprocket SP2 as a one-piece unitary member. In this embodiment, the coupling member CM1 includes at least one coupling pin CM1A. The coupling member CM1 includes a plurality of coupling pins CM1A. However, the coupling member CM1 can include another part instead of or in addition to the coupling pin CM1A. The coupling member CM1 can also be referred to as a first coupling member CM1.

Figure 8:
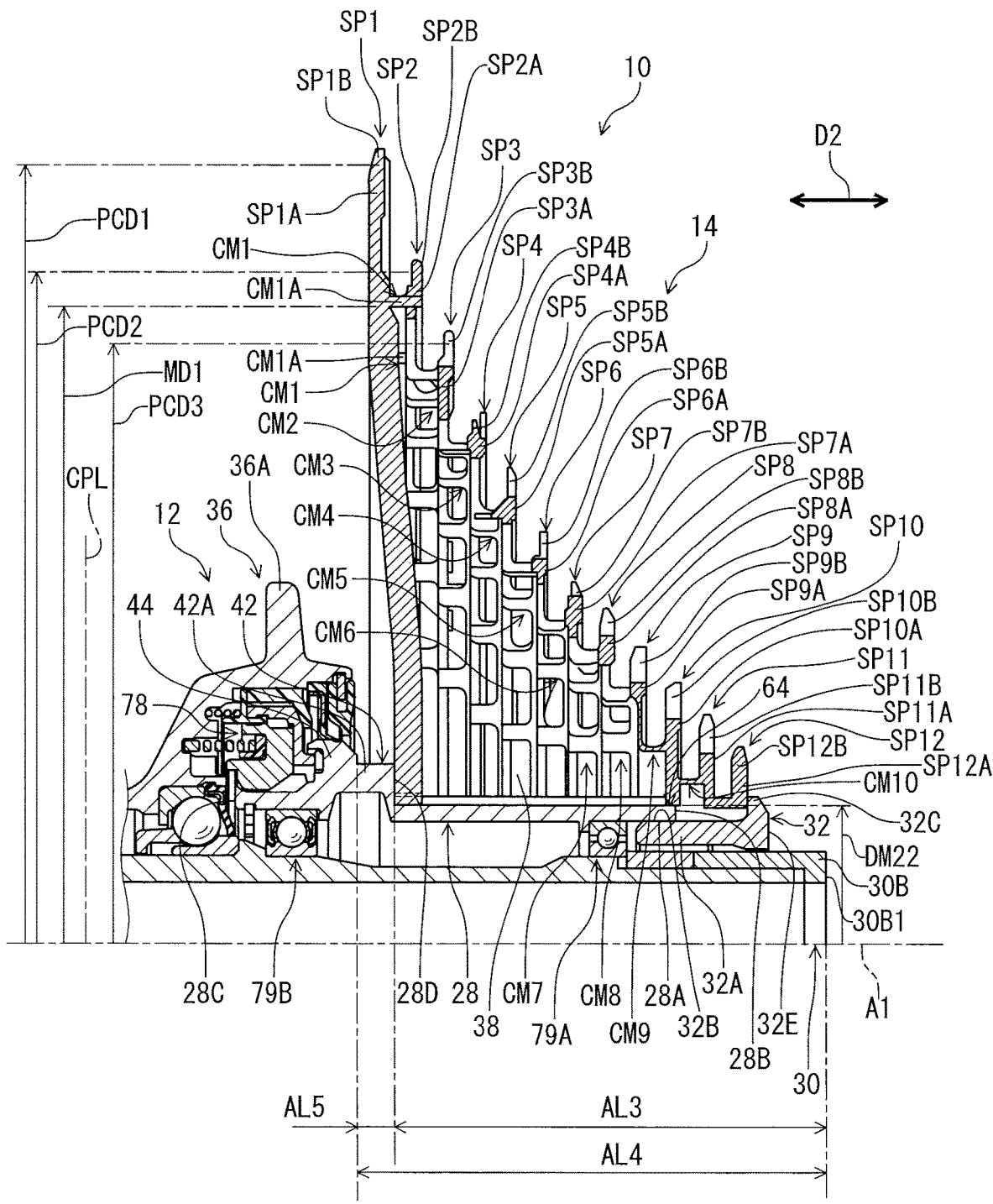
FIG. 8 is an enlarged cross-sectional view of the bicycle drive train in accordance with a modification.
Figure 9:
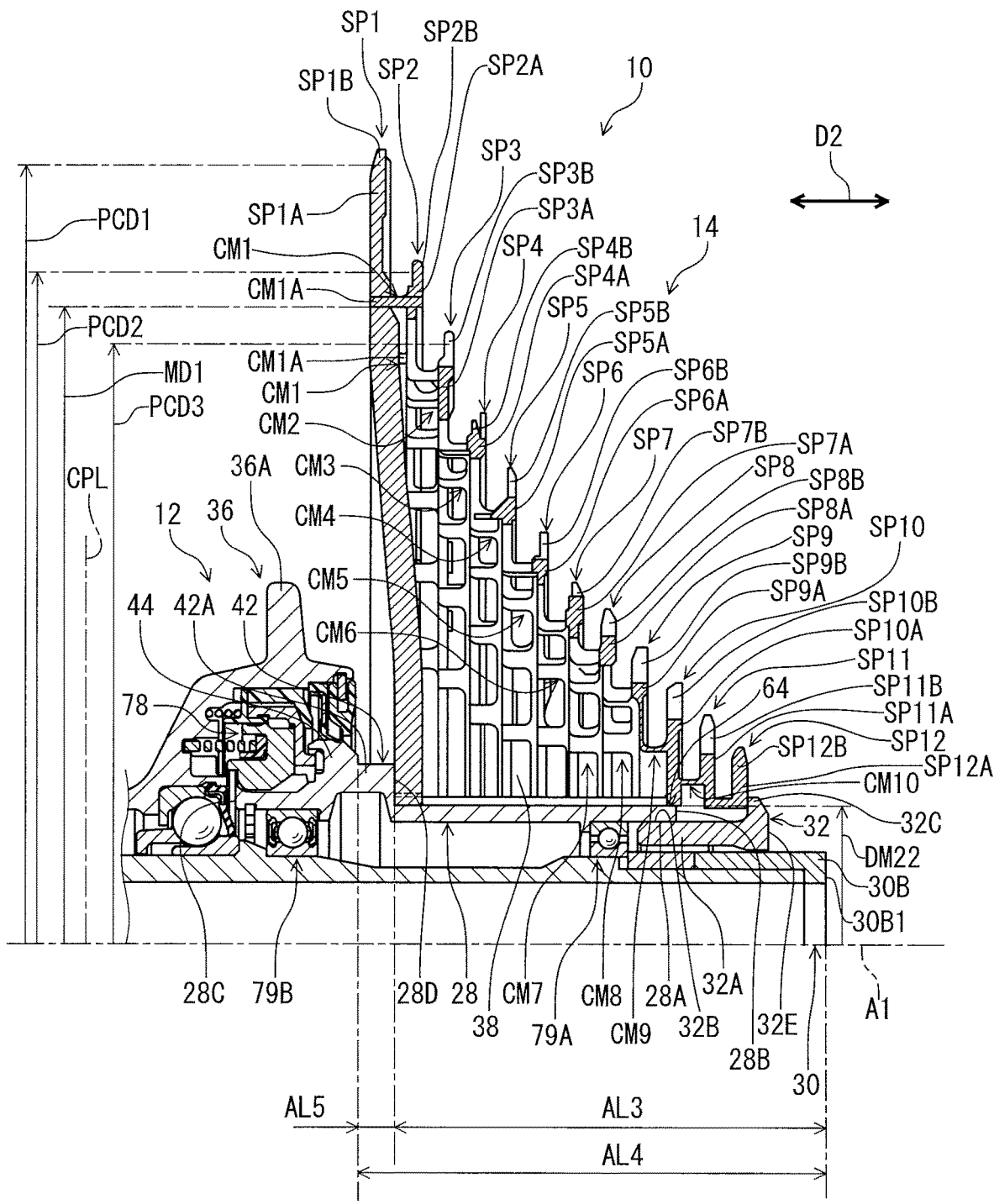
FIG. 9 is an enlarged cross-sectional view of the bicycle drive train in accordance with another modification.
Figure 10:
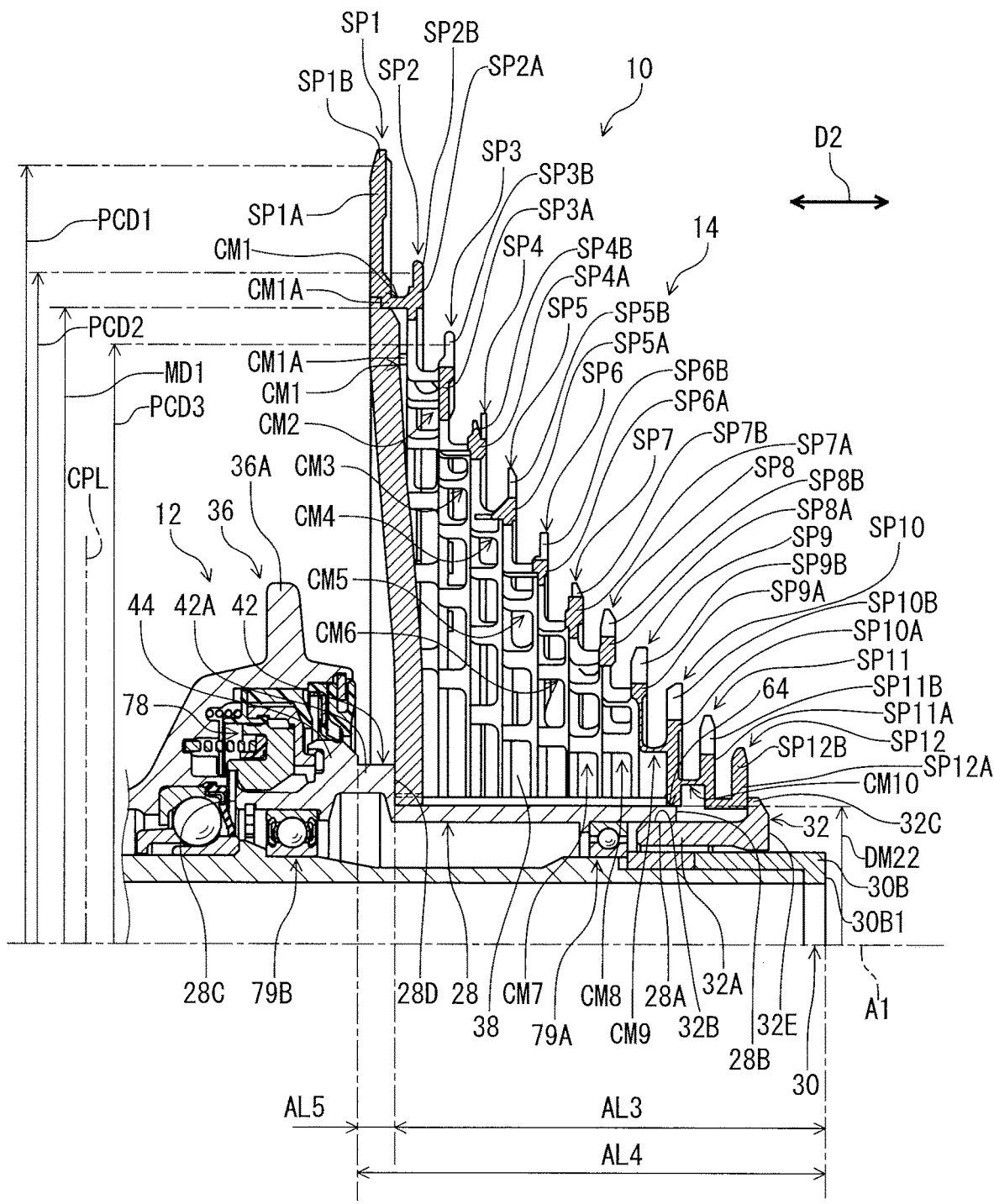
FIG. 10 is an enlarged cross-sectional view of the bicycle drive train in accordance with another modification.

As seen in FIG. 8, at least part of the coupling member CM1 can be integrally provided with the first sprocket SP1 as a one-piece unitary member. At least part of the coupling member CM1 can be a separate member from the second sprocket SP2. As seen in FIG. 9, the coupling member CM1 can be a separate member from the first sprocket SP1 and the second sprocket SP2. As seen in FIG. 10, the coupling member CM1 can be integrally provided with the first sprocket SP1 and the second sprocket SP2 as a one-piece unitary member. In such an embodiment, the plurality of first sprocket teeth SP1B and the plurality of second sprocket teeth SP2B are integrally provided with each other as a one-piece unitary member. The first sprocket SP1 includes a cap member 14A attached to the first sprocket body SP1A to engage with the sprocket support body 28.

The bicycle rear sprocket assembly 14 further comprises a second coupling member CM2 coupling the second sprocket SP2 to the third sprocket SP3. The second coupling member CM2 extends between the second sprocket SP2 and the third sprocket SP3 in the axial direction D2. The second coupling member CM2 includes a plurality of second coupling parts arranged circumferentially about the rotational center axis A1. In this embodiment, the second coupling member CM2 is integrally provided with the second sprocket SP2 and the third sprocket SP3. However, at least part of the second coupling member CM2 can be a separate member from at least one of the second sprocket SP2 and the third sprocket SP3.

The bicycle rear sprocket assembly 14 further comprises a third coupling member CM3 coupling the third sprocket SP3 to the fourth sprocket SP4. The bicycle rear sprocket assembly 14 further comprises a fourth coupling member CM4 coupling the fourth sprocket SP4 to the fifth sprocket SP5. The bicycle rear sprocket assembly 14 further comprises a fifth coupling member CM5 coupling the fifth sprocket SP5 to the sixth sprocket SP6. The bicycle rear sprocket assembly 14 further comprises a sixth coupling member CM6 coupling the sixth sprocket SP6 to the seventh sprocket SP7. The bicycle rear sprocket assembly 14 further comprises a seventh coupling member CM7 coupling the seventh sprocket SP7 to the eighth sprocket SP8. The bicycle rear sprocket assembly 14 further comprises an eighth coupling member CM8 coupling the eighth sprocket SP8 to the ninth sprocket SP9. The bicycle rear sprocket assembly 14 further comprises a ninth coupling member CM9 coupling the ninth sprocket SP9 to the tenth sprocket SP10. The bicycle rear sprocket assembly 14 further comprises a tenth coupling member CM10 coupling the tenth sprocket SP10 to the eleventh sprocket SP11. The bicycle rear sprocket assembly 14 further comprises an eleventh coupling member CM11 coupling the eleventh sprocket SP11 to the twelfth sprocket SP12.

The third to eleventh coupling members CM3 to CM11 have substantially the same structures as that of the second coupling member CM2. Thus, they will not be described in detail here for the sake of brevity.

In this embodiment, the first to twelfth sprockets SP1 to SP12 and the first to eleventh coupling members CM1 to CM11 define the internal cavity 38. The coupling members CM1 define the maximum outer diameter MD1. The internal cavity 38 is provided between the first sprocket SP1 and the twelfth sprocket SP12 in the axial direction D2. However, the internal cavity 38 is not limited to this embodiment.

As seen in FIG. 4, the lock member 32 includes a tubular body 32A, a male thread portion 32B, and a radial projection 32C. The tubular body 32A includes a first axial end 32D and a second axial end 32E. The second axial end 32E is opposite to the first axial end 32D in the axial direction D2 with respect to the rotational center axis A1 of the bicycle rear sprocket assembly 14. As seen in FIG. 6, the first axial end 32D is positioned closer to an axial center plane CPL of the bicycle hub assembly 12 than the second axial end 32E in a state where the bicycle rear sprocket assembly 14 is mounted to the bicycle hub assembly 12. The axial center plane CPL is perpendicular to the rotational center axis A1. As seen in FIG. 3, the axial center plane CPL is defined to bisect an axial length of the bicycle hub assembly 12 in the axial direction D2.

As seen in FIG. 6, the male thread portion 32B is provided to the first axial end 32D to engage with a female thread portion 28A of the sprocket support body 28 of the bicycle hub assembly 12 in the state where the bicycle rear sprocket assembly 14 is mounted to the bicycle hub assembly 12. The radial projection 32C extends radially outwardly from the second axial end 32E with respect to the rotational center axis A1 to restrict an axial movement of the first to twelfth sprockets SP1 to SP12 relative to the sprocket support body 28 of the bicycle hub assembly 12 in the state where the bicycle rear sprocket assembly 14 is mounted to the bicycle hub assembly 12. The radial projection 32C is configured to abut against the twelfth sprocket SP12.

Figure 11:
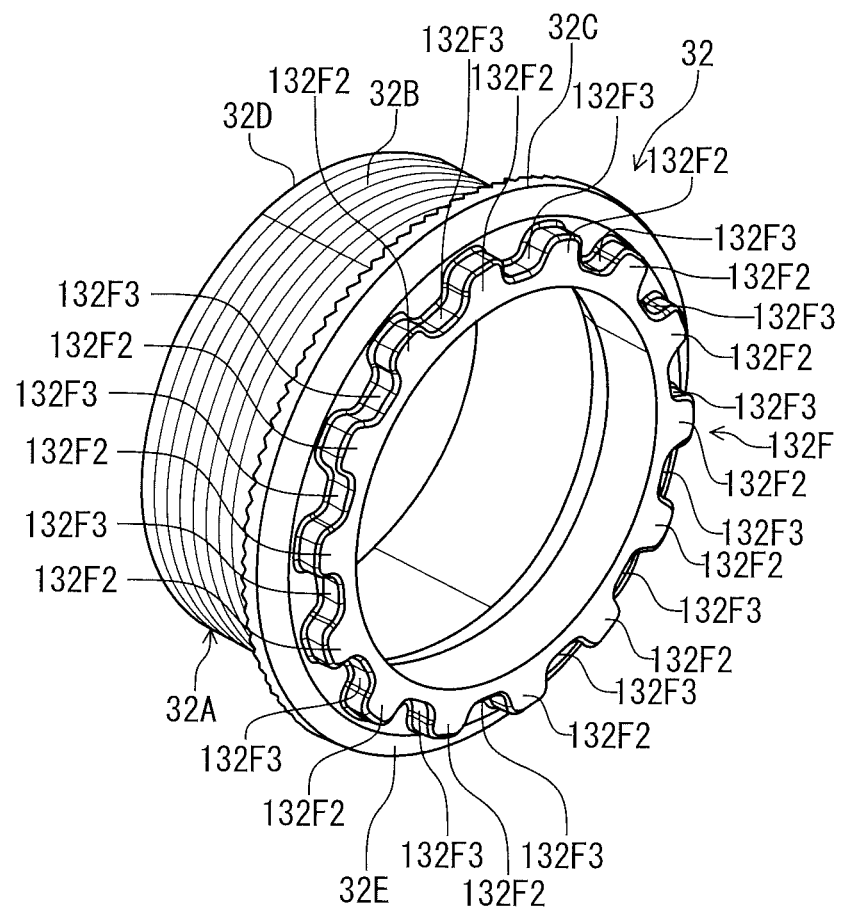
FIG. 11 is a perspective view of a lock member of the bicycle rear sprocket assembly in accordance with a modification.

As seen in FIG. 4, the lock member 32 has a tool engagement portion 32F. The tool engagement portion 32F is provided on an inner peripheral surface 32A1 of the tubular body 32A to be engaged with a securing tool (not shown). In this embodiment, the tool engagement portion 32F includes a plurality of engagement grooves 32G to be engaged with the securing tool when the lock member 32 is threadedly attached to the sprocket support body 28 with the male thread portion 32B and the female thread portion 28A. The structure of the tool engagement portion 32F is not limited to this embodiment. For example, as seen in FIG. 11, the lock member 32 can have a tool engagement portion 132F. The tool engagement portion 132F is provided on the second axial end 32E. The tool engagement portion 132F includes an annular part 132F1 and a plurality of protrusions 132F2 extending radially outwardly from the annular part 132F1. The plurality of protrusions 132F2 is circumferentially arranged at a constant pitch. The plurality of protrusions 132F2 defines a plurality of engagement grooves 132F3 to be engaged with the securing tool when the lock member 32 is threadedly attached to the sprocket support body 28 (FIG. 4) with the male thread portion 32B and the female thread portion 28A (FIG. 4).

Figure 12:
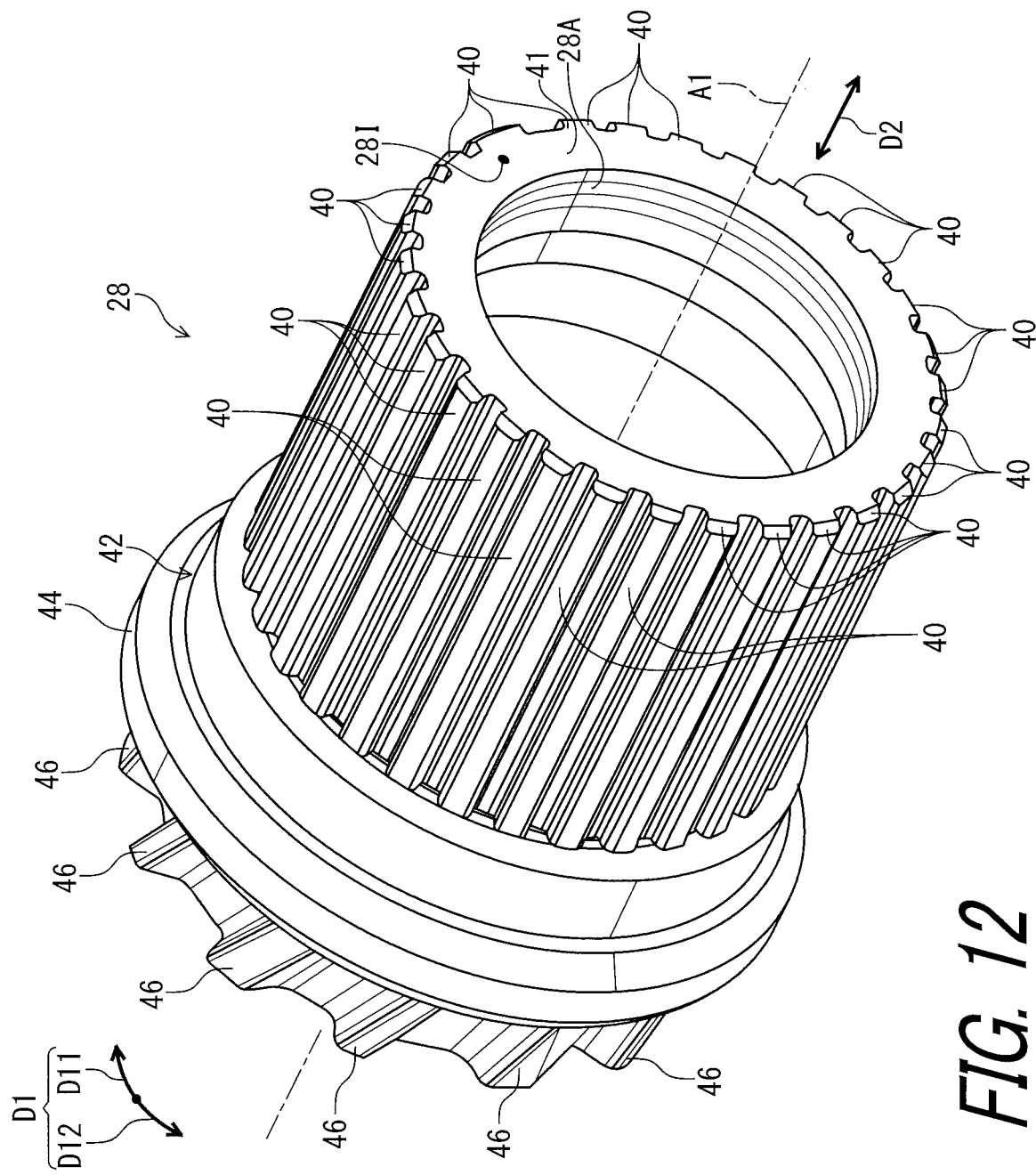
FIG. 12 is a perspective view of a sprocket support body of the bicycle hub assembly illustrated in FIG. 4.
Figure 13:
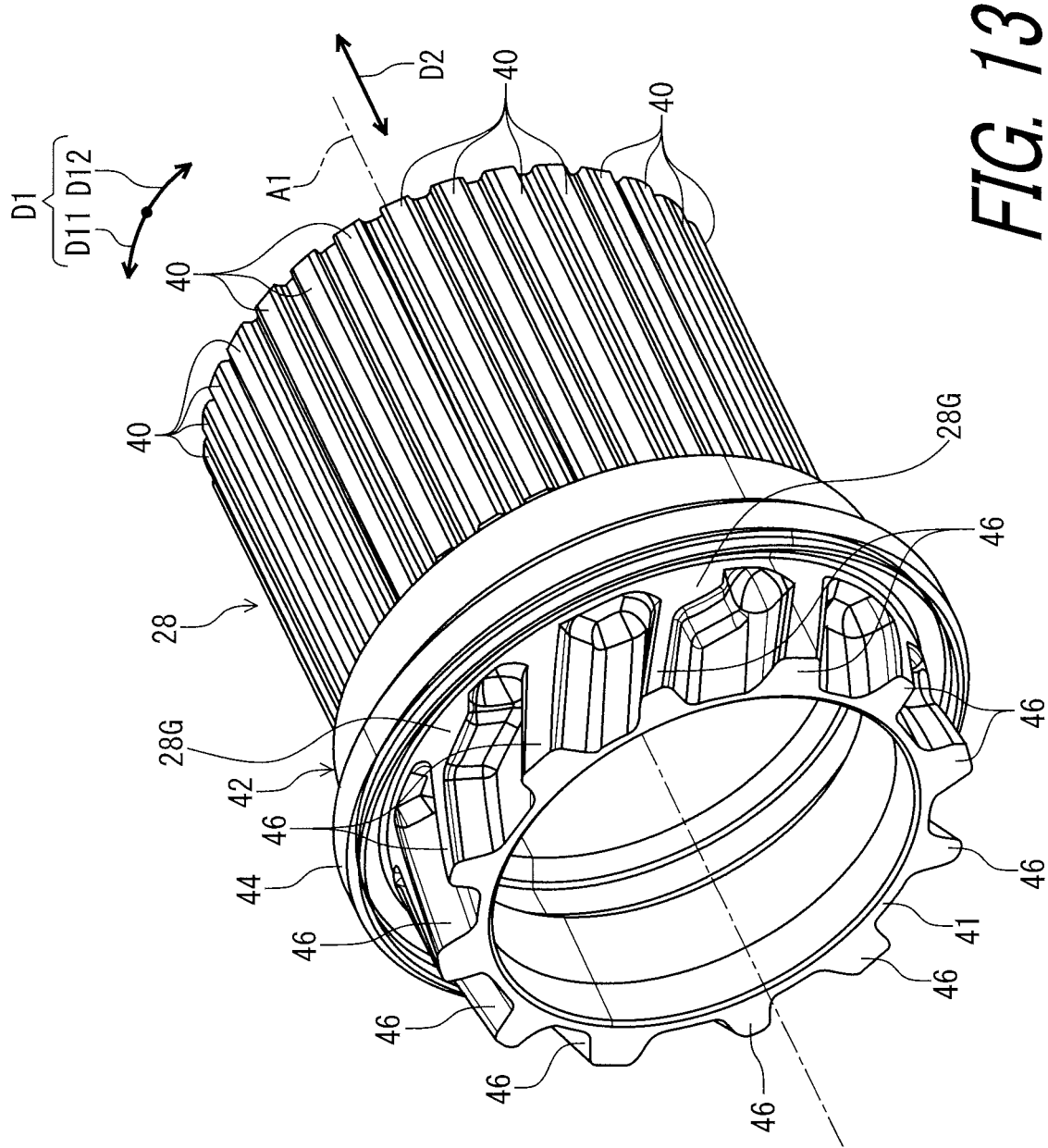
FIG. 13 is another perspective view of the sprocket support body of the bicycle hub assembly illustrated in FIG. 4.

As seen in FIGS. 12 and 13, the sprocket support body 28 includes at least one external spline tooth 40 configured to engage with the bicycle rear sprocket assembly 14 (FIG. 6). The sprocket support body 28 includes at least ten external spline teeth 40 configured to engage with the bicycle rear sprocket assembly 14 (FIG. 6). Namely, the at least one external spline tooth 40 includes a plurality of external spline teeth 40.

The sprocket support body 28 includes a base support 41 having a tubular shape. The base support 41 extends along the rotational center axis A1. The external spline tooth 40 extends radially outwardly from the base support 41. The sprocket support body 28 includes a larger-diameter part 42, a flange 44, and a plurality of helical external spline teeth 46. The larger-diameter part 42 and the flange 44 extend radially outwardly from the base support 41. The larger-diameter part 42 is provided between the plurality of external spline teeth 40 and the flange 44 in the axial direction D2. The larger-diameter part 42 and the flange are provided between the plurality of external spline teeth 40 and the plurality of helical external spline teeth 46 in the axial direction D2. As seen in FIG. 6, the bicycle rear sprocket assembly 14 is held between the larger-diameter part 42 and the radial projection 32C of the lock member 32 in the axial direction D2. The larger-diameter part 42 may have an interior cavity so that a drive structure such as a one-way clutch structure can be contained within the interior cavity. The larger-diameter part 42 can be omitted from the bicycle hub assembly 12 according to need.

Figure 14:
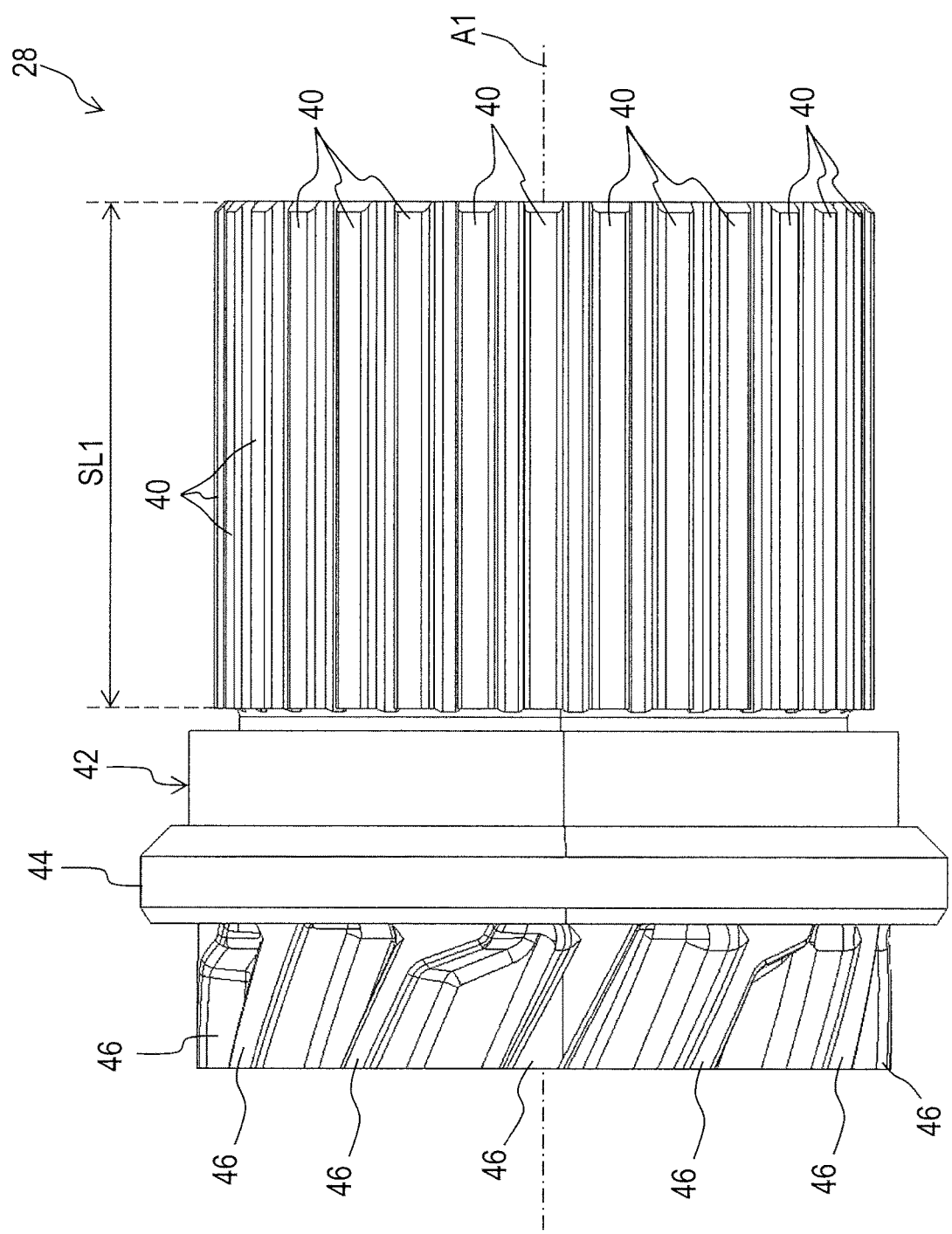
FIG. 14 is a rear view of the sprocket support body of the bicycle hub assembly illustrated in FIG. 4.

As seen in FIG. 14, at least one of the at least ten external spline teeth 40 has an axial spline-tooth length SL1. Each of the external spline teeth 40 has the axial spline-tooth length SL1. The axial spline-tooth length SL1 is equal to or smaller than 27 mm. The axial spline-tooth length SL1 is equal to or larger than 22 mm. In this embodiment, the axial spline-tooth length SL1 is 24.9 mm. However, the axial spline-tooth length SL1 is not limited to this embodiment and the above range.

Figure 15:
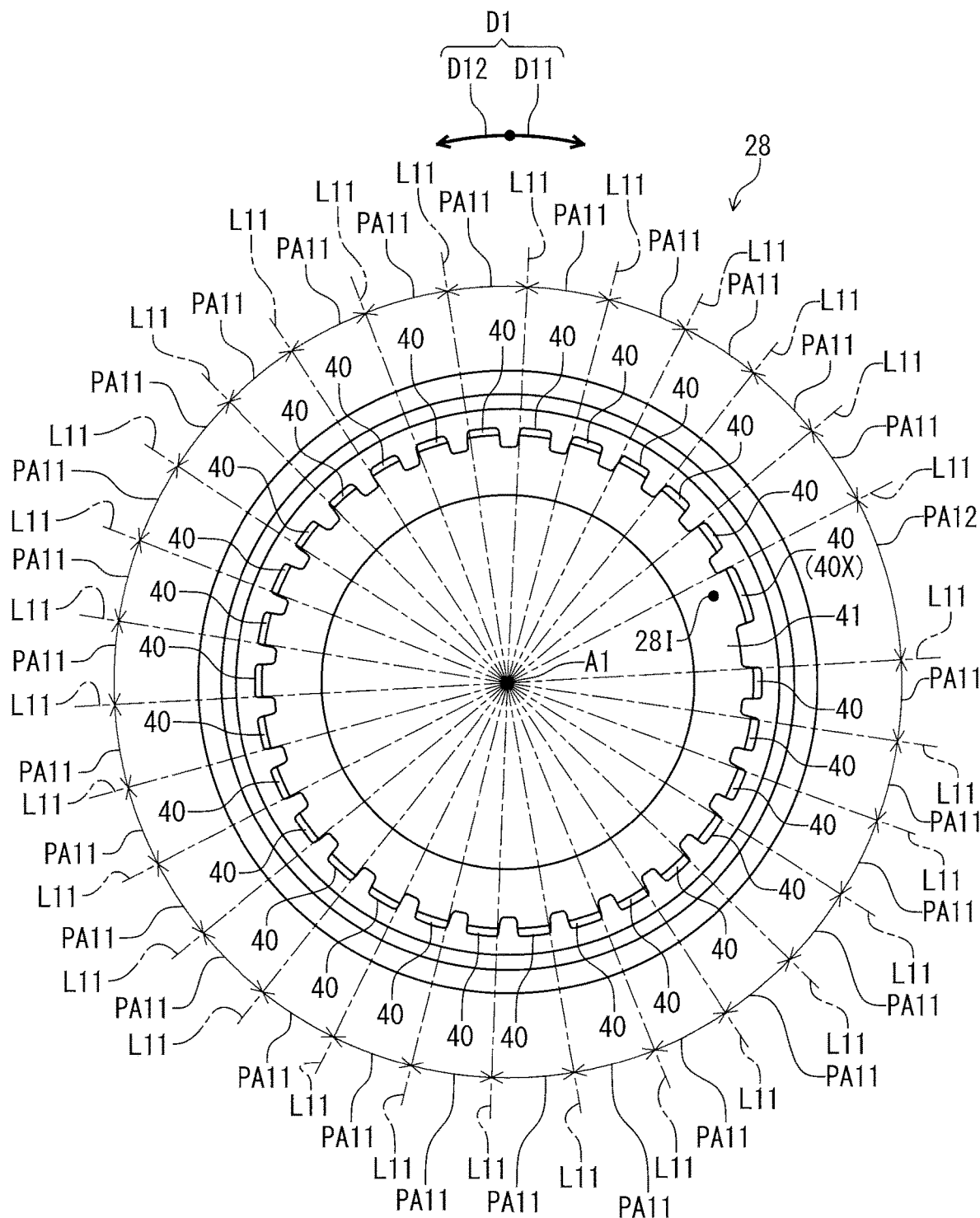
FIG. 15 is a side elevational view of the sprocket support body of the bicycle hub assembly illustrated in FIG. 4.

As seen in FIG. 15, a total number of the at least ten external spline teeth 40 is equal to or larger than 20. The total number of the at least ten external spline teeth 40 is preferably equal to or larger than 25. The total number of the at least ten external spline teeth 40 is preferably equal to or larger than 28. The total number of the external spline teeth 40 is preferably equal to or smaller than 72. In this embodiment, the total number of the external spline teeth 40 is 29. However, the total number of the external spline teeth 40 is not limited to this embodiment and the above ranges.

The at least ten external spline teeth 40 have a first external pitch angle PA11 and a second external pitch angle PA12. At least two external spline teeth of the at least ten external spline teeth 40 are circumferentially arranged at the first external pitch angle PA11 with respect to the rotational center axis A1. In other words, at least two of the plurality of external spline teeth 40 are circumferentially arranged at the first external pitch angle PA11 with respect to the rotational center axis A1 of the bicycle hub assembly 12. At least two external spline teeth of the at least ten external spline teeth 40 are circumferentially arranged at the second external pitch angle PA12 with respect to the rotational center axis A1 of the bicycle hub assembly 12. In other words, at least two of the plurality of external spline teeth 40 are circumferentially arranged at the second external pitch angle PA12 with respect to the rotational center axis A1 of the bicycle hub assembly 12. In this embodiment, the second external pitch angle PA12 is different from the first external pitch angle PA11. However, the second external pitch angle PA12 can be substantially equal to the first external pitch angle PA11.

In this embodiment, the external spline teeth 40 are arranged at the first external pitch angle PA11 in the circumferential direction D1. Two external spline teeth of the external spline teeth 40 are arranged at the second external pitch angle PA12 in the circumferential direction D1. However, at least two external spline teeth of the external spline teeth 40 can be arranged at another external pitch angle in the circumferential direction D1.

The first external pitch angle PA11 ranges from 5 degrees to 36 degrees. The first external pitch angle PA11 preferably ranges from 10 degrees to 20 degrees. The first external pitch angle PA11 is preferably equal to or smaller than 15 degrees. In this embodiment, the first external pitch angle PA11 is 12 degrees. However, the first external pitch angle PA11 is not limited to this embodiment and the above ranges.

The second external pitch angle PA12 ranges from 5 degrees to 36 degrees. In this embodiment, the second external pitch angle PA12 is 24 degrees. However, the second external pitch angle PA12 is not limited to this embodiment and the above range.

Figure 16:
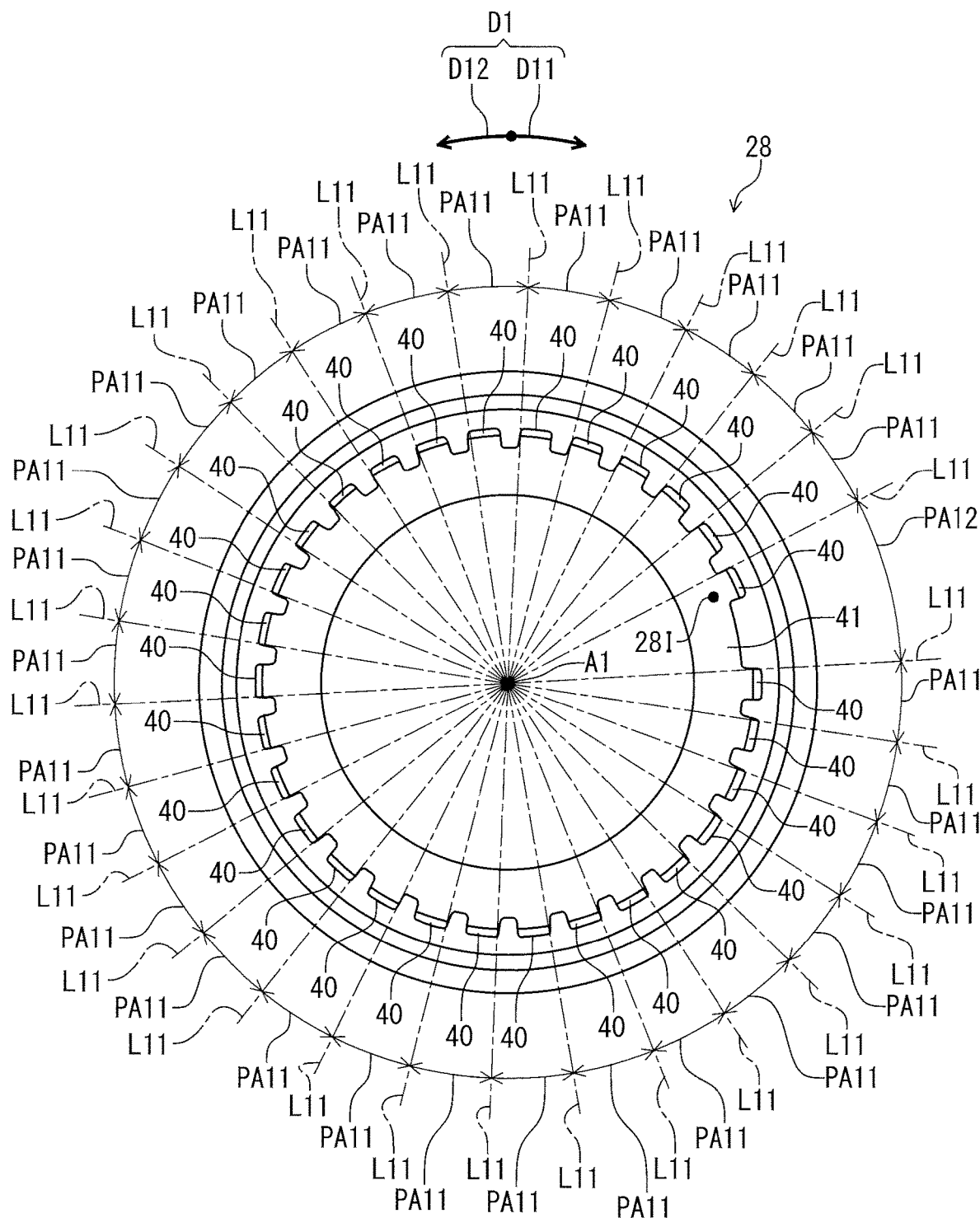
FIG. 16 is a side elevational view of the sprocket support body of the bicycle hub assembly in accordance with a modification.

At least one of the external spline teeth 40 can have a first spline shape different from a second spline shape of another of the external spline teeth 40. At least one of the at least ten external spline teeth 40 can have a first spline size different from a second spline size of another of the at least ten external spline teeth 40. At least one of the external spline teeth 40 has a profile different from a profile of another of the external spline teeth 40 when viewed along the rotational center axis A1. In this embodiment, the external spline tooth 40X has the first spline shape different from the second spline shape of another of the external spline teeth 40. The external spline tooth 40X has the first spline size different from the second spline size of another of the external spline teeth 40. As seen in FIG. 16, however, the at least ten external spline teeth 40 can have the same spline shape as each other. The at least ten external spline teeth 40 can have the same spline size as each other. The at least ten external spline teeth 40 can have the same profile as each other.

Figure 17:
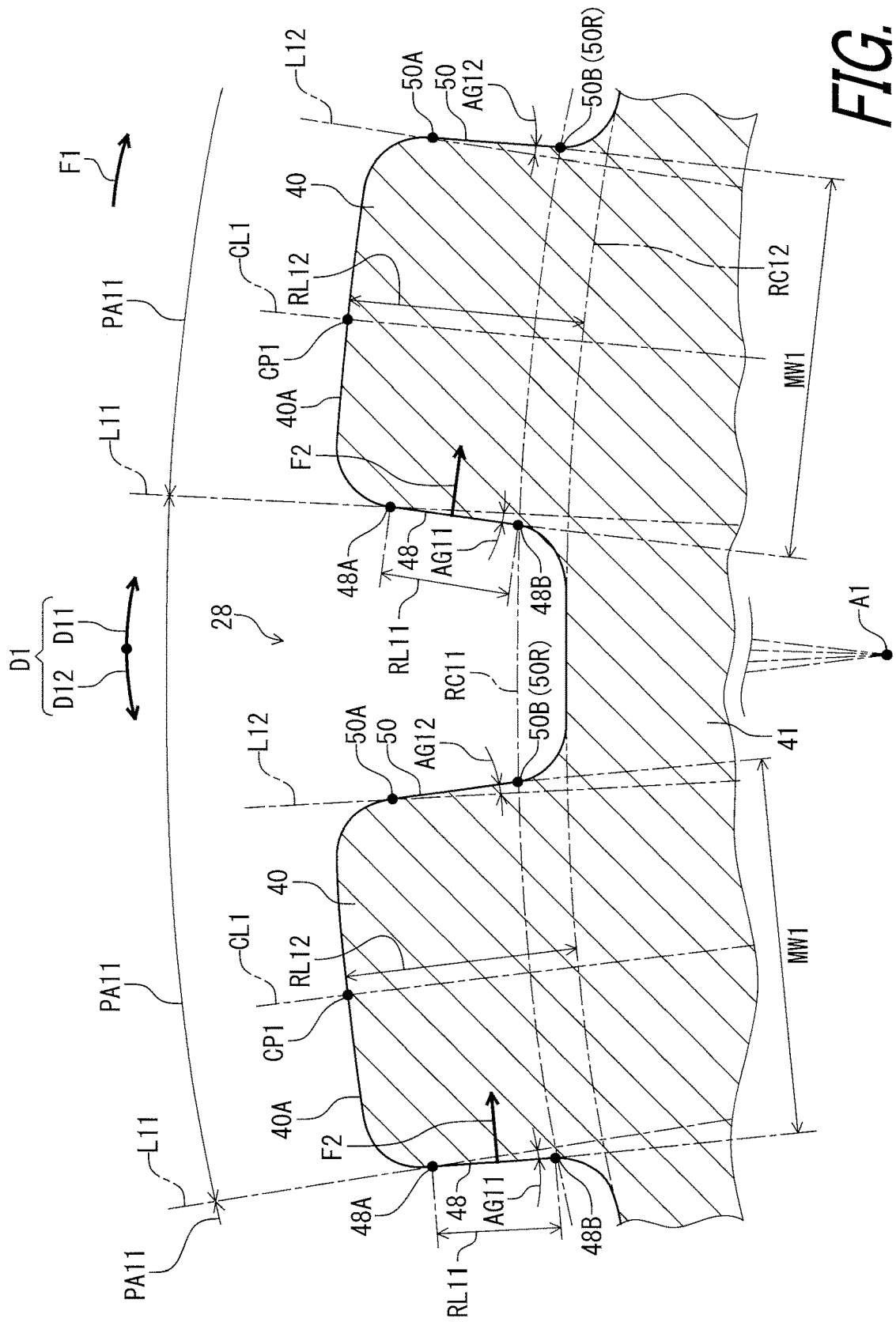
FIG. 17 is an enlarged cross-sectional view of the sprocket support body illustrated in FIG. 15.

As seen in FIG. 17, each of the at least ten external spline teeth 40 has an external-spline driving surface 48 and an external-spline non-driving surface 50. The plurality of external spline teeth 40 includes a plurality of external-spline driving surfaces 48 to receive the driving rotational force F1 from the bicycle rear sprocket assembly 14 (FIG. 6) during pedaling. The plurality of external spline teeth 40 includes a plurality of external-spline non-driving surfaces 50. The external-spline driving surface 48 is contactable with the bicycle rear sprocket assembly 14 to receive the driving rotational force F1 from the bicycle rear sprocket assembly 14 (FIG. 6) during pedaling. The external-spline driving surface 48 faces in the reverse rotational direction D12. The external-spline driving surface 48 faces an internal-spline driving surface of the bicycle rear sprocket assembly 14 in a state where the bicycle rear sprocket assembly 14 is mounted to the bicycle hub assembly 12. The external-spline non-driving surface 50 is provided on a reverse side of the external-spline driving surface 48 in the circumferential direction D1. The external-spline non-driving surface 50 faces in the driving rotational direction D11 not to receive the driving rotational force F1 from the bicycle rear sprocket assembly 14 during pedaling. The external-spline non-driving surface 50 faces an internal-spline non-driving surface of the bicycle rear sprocket assembly 14 in a state where the bicycle rear sprocket assembly 14 is mounted to the bicycle hub assembly 12.

The at least ten external spline teeth 40 respectively have circumferential maximum widths MW1. The external spline teeth 40 respectively have circumferential maximum widths MW1. The circumferential maximum width MW1 is defined as a maximum width to receive a thrust force F2 applied to the external spline tooth 40. The circumferential maximum width MW1 is defined as a straight distance based on the external-spline driving surface 48.

The plurality of external-spline driving surfaces 48 each includes a radially outermost edge 48A and a radially innermost edge 48B. The external-spline driving surface 48 extends from the radially outermost edge 48A to the radially innermost edge 48B. A first reference circle RC11 is defined on the radially innermost edge 48B and is centered at the rotational center axis A1. The first reference circle RC11 intersects with the external-spline non-driving surface 50 has a reference point 50R. The circumferential maximum width MW1 extends straight from the radially innermost edge 48B to the reference point 50R in the circumferential direction D1.

The plurality of external-spline non-driving surfaces 50 each includes a radially outermost edge 50A and a radially innermost edge 50B. The external-spline non-driving surface 50 extends from the radially outermost edge 50A to the radially innermost edge SOB. In this embodiment, the reference point 50R is coincident with the radially innermost edge 50B. However, the reference point 50R can be offset from the radially innermost edge 50B.

A total of the circumferential maximum widths MW1 is equal to or larger than 55 mm. The total of the circumferential maximum widths MW1 is preferably equal to or larger than 60 mm. The total of the circumferential maximum widths MW1 is preferably equal to or smaller than 70 mm. In this embodiment, the total of the circumferential maximum widths MW1 is 60.1 mm. However, the total of the circumferential maximum widths MW1 is not limited to this embodiment and the above ranges.

Figure 18:
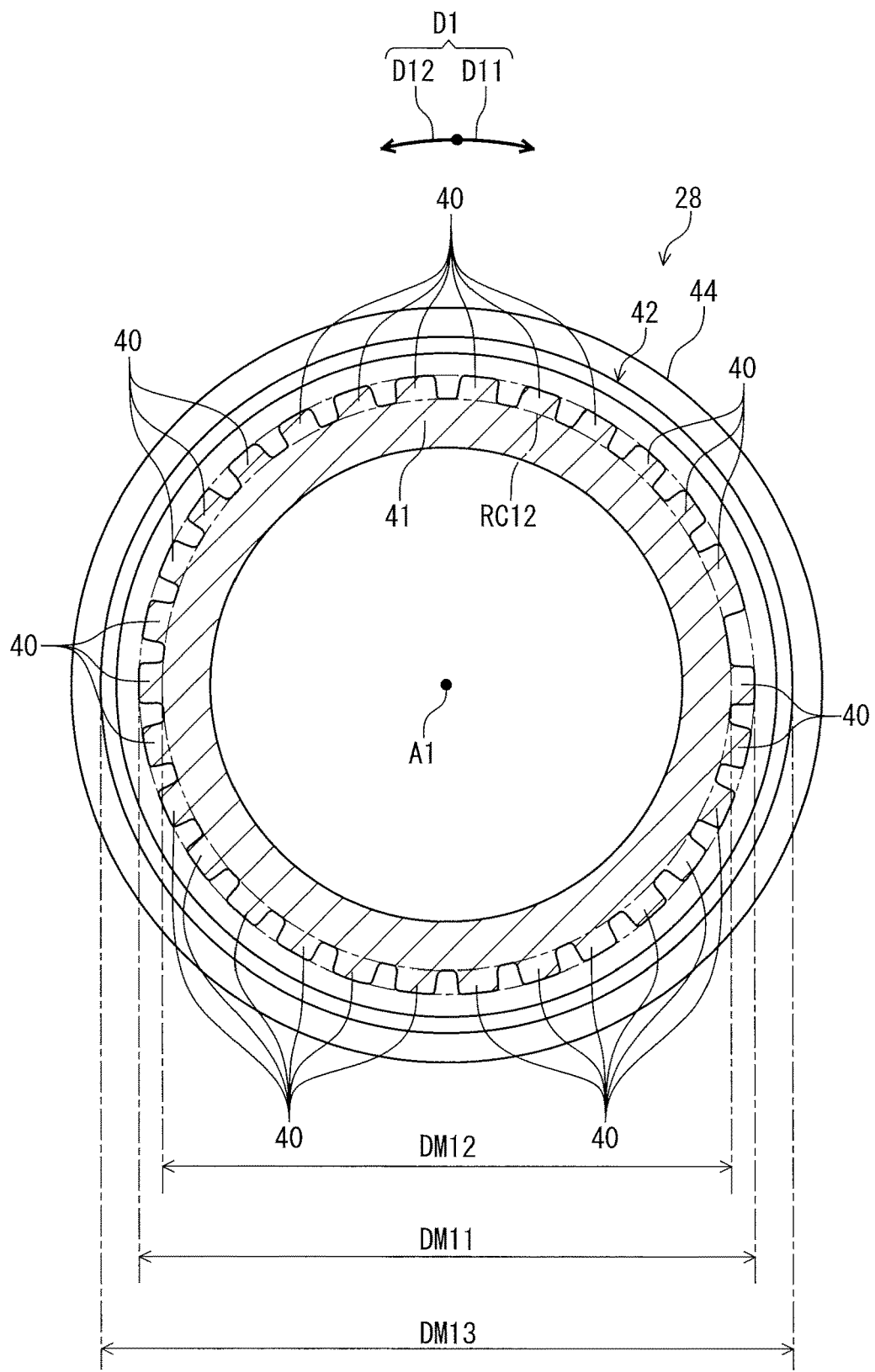
FIG. 18 is a cross-sectional view of the sprocket support body illustrated in FIG. 15.

As seen in FIG. 18, the at least one external spline tooth 40 has an external-spline major diameter DM11 that is equal to or smaller than 34 mm. The external-spline major diameter DM11 is equal to or smaller than 33 mm. The external-spline major diameter DM11 is equal to or larger than 29 mm. In this embodiment, the external-spline major diameter DM11 is 32.6 mm. However, the external-spline major diameter DM11 is not limited to this embodiment and the above ranges.

The at least one external spline tooth 40 has an external-spline minor diameter DM12. The at least one external spline tooth 40 has an external-spline root circle RC12 having the external-spline minor diameter DM12. However, the external-spline root circle RC12 can have another diameter different from the external-spline minor diameter DM12. The external-spline minor diameter DM12 is equal to or smaller than 32 mm. The external-spline minor diameter DM12 is equal to or smaller than 31 mm. The external-spline minor diameter DM12 is equal to or larger than 28 mm. In this embodiment, the external-spline minor diameter DM12 is 30.2 mm. However, the external-spline minor diameter DM12 is not limited to this embodiment and the above ranges.

The larger-diameter part 42 has an outer diameter DM13 larger than the external-spline major diameter DM11. The outer diameter DM13 ranges from 32 mm to 40 mm. In this embodiment, the outer diameter DM13 is 35 mm. However, the outer diameter DM13 is not limited to this embodiment.

As seen in FIG. 17, the plurality of external-spline driving surfaces 48 each includes a radial length RL11 defined from the radially outermost edge 48A to the radially innermost edge 48B. A total of the radial lengths RL11 of the plurality of external-spline driving surfaces 48 is equal to or larger than 7 mm. The total of the radial lengths RL11 is equal to or larger than 10 mm. The total of the radial lengths RL11 is equal to or larger than 15 mm. The total of the radial lengths is equal to or smaller than 36 mm. In this embodiment, the total of the radial lengths RL11 is 16.6 mm. However, the total of the radial lengths RL11 is not limited to this embodiment.

The plurality of external spline tooth 40 has an additional radial length RL12. The additional radial lengths RL12 are respectively defined from the external-spline root circle RC12 to radially outermost ends 40A of the plurality of external spline teeth 40. A total of the additional radial lengths RL12 is equal to or larger than 20 mm. In this embodiment, the total of the additional radial lengths RL12 is 31.2 mm. However, the total of the additional radial lengths RL12 is not limited to this embodiment.

At least one of the at least ten external spline teeth 40 is circumferentially symmetric with respect to a reference line CL1. The reference line CL1 extends from the rotational center axis A1 to a circumferential center point CP1 of a radially outermost end 40A of the at least one of the at least ten external spline teeth 40 in a radial direction with respect to the rotational center axis A1. However, at least one of the external spline teeth 40 can have an asymmetric shape with respect to the reference line CL1. The at least one of the at least nine external spline teeth 40 comprises the external-spline driving surface 48 and the external-spline non-driving surface 50.

At least one surface of the plurality of external-spline driving surfaces 48 has a first external-spline-surface angle AG11. The first external-spline-surface angle AG11 is defined between the external-spline driving surface 48 and a first radial line L11. The first radial line L11 extends from the rotational center axis A1 of the bicycle hub assembly 12 to the radially outermost edge 48A of the external-spline driving surface 48. The first external pitch angle PA11 or the second external pitch angle PA12 is defined between the first radial lines L11 (see, e.g., FIG. 15).

At least one of the external-spline non-driving surfaces 50 has a second external-spline-surface angle AG12. The second external-spline-surface angle AG12 is defined between the external-spline non-driving surface 50 and a second radial line L12. The second radial line L12 extends from the rotational center axis A1 of the bicycle hub assembly 12 to the radially outermost edge 50A of the external-spline non-driving surface 50.

In this embodiment, the second external-spline-surface angle AG12 is equal to the first external-spline-surface angle AG11. However, the first external-spline-surface angle AG11 can be different from the second external-spline-surface angle AG12.

The first external-spline-surface angle AG11 is equal to or smaller than 6 degrees. The first external-spline-surface angle AG11 is equal to or larger than 0 degree. The second external-spline-surface angle AG12 is equal to or smaller than 6 degrees. The second external-spline-surface angle AG12 is equal to or larger than 0 degree. In this embodiment, the first external-spline-surface angle AG11 is 5 degrees. The second external-spline-surface angle AG12 is 5 degrees. However, the first external-spline-surface angle AG11 and the second external-spline-surface angle AG12 are not limited to this embodiment and the above ranges.

Figure 19:
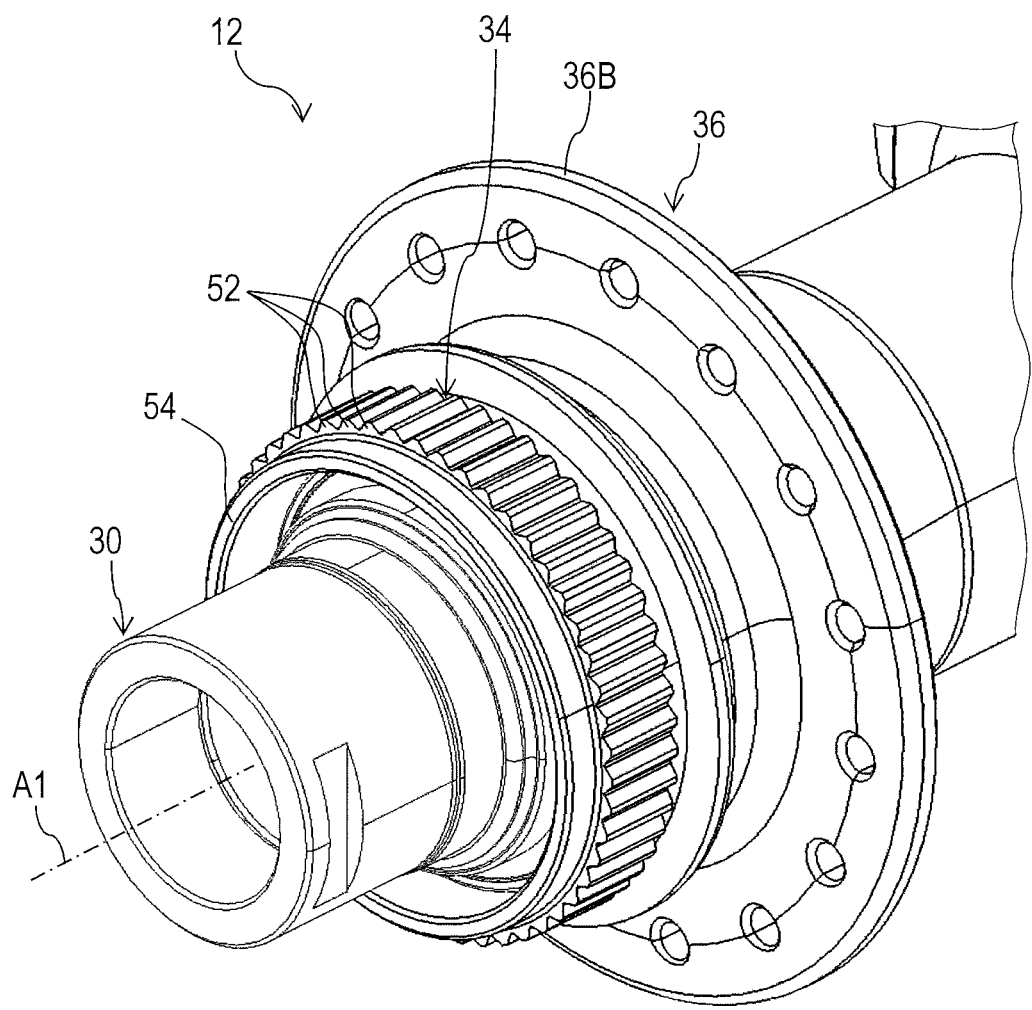
FIG. 19 is a perspective view of the bicycle hub assembly illustrated in FIG. 4.
Figure 20:
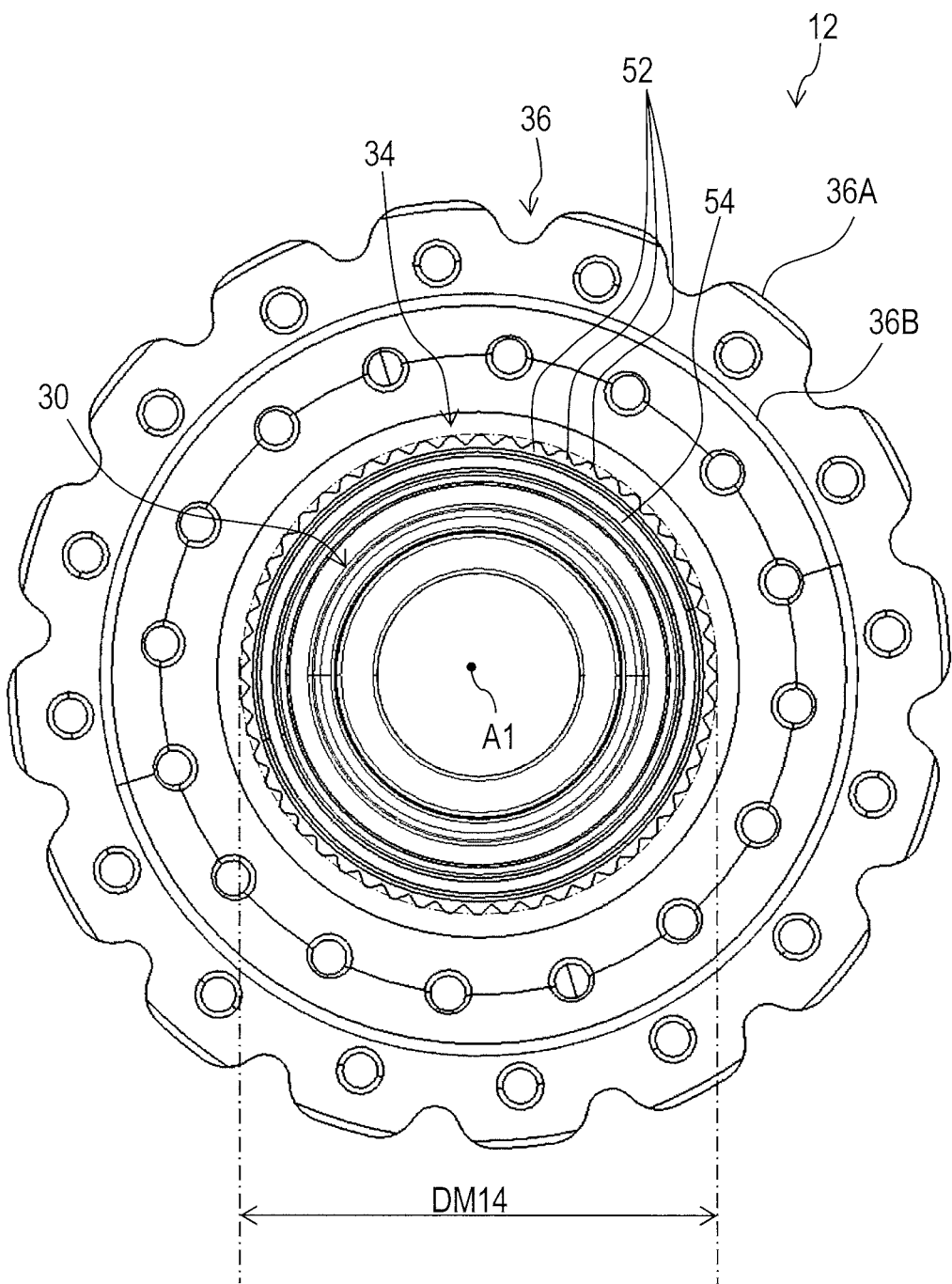
FIG. 20 is a side elevational view of the bicycle hub assembly illustrated in FIG. 4.

As seen in FIGS. 19 and 20, the brake-rotor support body 34 includes at least one additional external spline tooth 52 configured to engage with the bicycle brake rotor 16 (FIG. 1). In this embodiment, the brake-rotor support body 34 includes an additional base support 54 and a plurality of additional external spline teeth 52. The additional base support 54 has a tubular shape and extends from the hub body 36 along the rotational center axis A1. The additional external spline tooth 52 extends radially outwardly from additional base support 54. A total number of the additional external spline teeth 52 is 52. However, the total number of the additional external spline teeth 52 is not limited to this embodiment.

Figure 21:
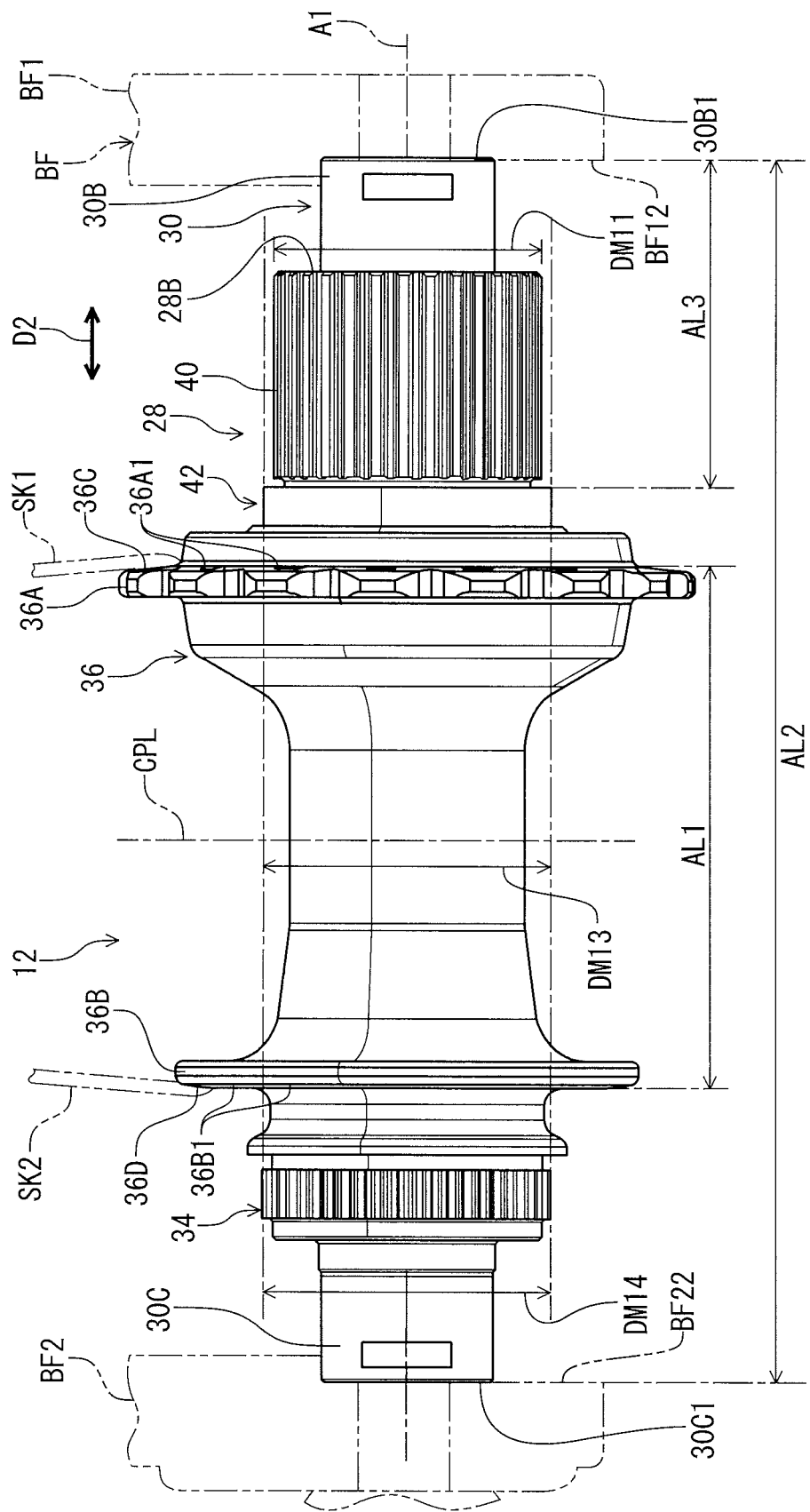
FIG. 21 is a rear view of the bicycle hub assembly illustrated in FIG. 4.

As seen in FIG. 20, the at least one additional external spline tooth 52 has an additional external-spline major diameter DM14. As seen in FIG. 21, the additional external-spline major diameter DM14 is larger than the external-spline major diameter DM11. The additional external-spline major diameter DM14 is substantially equal to the outer diameter DM13 of the larger-diameter part 42. However, the additional external-spline major diameter DM14 can be equal to or smaller than the external-spline major diameter DM11. The additional external-spline major diameter DM14 can be different from the outer diameter DM13 of the larger-diameter part 42.

As seen in FIG. 21, the hub body 36 includes a first spoke-mounting portion 36A and a second spoke-mounting portion 36B. A plurality of first spokes SK1 are coupled to the first spoke-mounting portion 36A. A plurality of second spokes SK2 are coupled to the second spoke-mounting portion 36B. In this embodiment, the first spoke-mounting portion 36A includes a plurality of first attachment holes 36A1. The first spoke SK1 extends through the first attachment hole 36A1. The second spoke-mounting portion 36B includes a plurality of second attachment holes 36B1. The second spoke SK2 extends through the second attachment hole 36B1. The term "spoke-mounting portion", as used herein, encompasses configurations in which the spoke-mounting opening has a flange-like shape so that the spoke mounting portion extends radially outwardly with respect to the rotational center axis of the bicycle hub assembly as seen in FIG. 21, and configurations in which the spoke mounting portion is an opening directly formed on a radially outer peripheral surface of the hub body.

The second spoke-mounting portion 36B is spaced apart from the first spoke-mounting portion 36A in the axial direction D2. The first spoke-mounting portion 36A is provided between the sprocket support body 28 and the second spoke-mounting portion 36B in the axial direction D2. The second spoke-mounting portion 36B is provided between the first spoke-mounting portion 36A and the brake-rotor support body 34 in the axial direction D2.

The first spoke-mounting portion 36A has a first axially outermost part 36C. The second spoke-mounting portion 36B has a second axially outermost part 36D. The first axially outermost part 36C includes a surface facing toward the first frame BF1 in the axial direction D2 in a state where the bicycle hub assembly 12 is mounted to the bicycle frame B. The second axially outermost part 36D includes a surface facing toward the second frame BF2 in the axial direction D2 in a state where the bicycle hub assembly 12 is mounted to the bicycle frame B.

The hub body 36 includes a first axial length AL1. The first axial length AL1 is defined between the first axially outermost part 36C of the first spoke-mounting portion 36A and the second axially outermost part 36D of the second spoke-mounting portion 36B in the axial direction D2 with respect to the rotational center axis A1 of the bicycle rear sprocket assembly 14. The first axial length AL1 can be equal to or larger than 55 mm. The first axial length AL1 can be equal to or larger than 60 mm. The first axial length AL1 can be equal to or larger than 65 mm. In this embodiment, the first axial length AL1 can be 67 mm. However, the first axial length AL1 is not limited to this embodiment and the above ranges. Examples of the first axial length AL1 include 55.7 mm, 62.3 mm, and 67 mm.

As seen in FIG. 21, the hub axle 30 includes a first axial frame abutment surface 30B1 and a second axial frame abutment surface 30C1. The first axial frame abutment surface 30B1 is configured to abut against a first part BF12 of the bicycle frame BF in the axial direction D2 with respect to the rotational center axis A1 of the bicycle rear sprocket assembly 14 in a state where the bicycle hub assembly 12 is mounted to the bicycle frame BF. The second axial frame abutment surface 30C1 is configured to abut against a second part BF22 of the bicycle frame BF in the axial direction D2 in the state where the bicycle hub assembly 12 is mounted to the bicycle frame BF. The first axial frame abutment surface 30B1 is positioned closer to the sprocket support body 28 than the second axial frame abutment surface 30C1 in the axial direction D2. The sprocket support body 28 is provided between the first axial frame abutment surface 30B1 and the second axial frame abutment surface 30C1 in the axial direction D2.

The hub axle 30 includes a second axial length AL2 defined between the first axial frame abutment surface 30B1 and the second axial frame abutment surface 30C1 in the axial direction D2. The second axial length AL2 can be equal to or larger than 140 mm. The second axial length AL2 can be equal to or larger than 145 mm. The second axial length AL2 can be equal to or larger than 147 mm. The second axial length AL2 can be 148 mm. However, the second axial length AL2 is not limited to this embodiment and the above ranges. Examples of the second axial length AL2 include 142 mm, 148 mm, and 157 mm.

A ratio of the first axial length AL1 to the second axial length AL2 can be equal to or larger than 0.3. The ratio of the first axial length AL1 to the second axial length AL2 can be equal to or larger than 0.4. The ratio of the first axial length AL1 to the second axial length AL2 can be equal to or smaller than 0.5. For example, the ratio of the first axial length AL1 (67 mm) to the second axial length AL2 (148 mm) is approximately 0.45. However, the ratio of first axial length AL1 to the second axial length AL2 is not limited to this embodiment and the above ranges. Examples of the ratio of the first axial length AL1 to the second axial length AL2 include approximately 0.42 (AL1 is 62.3 mm and AL2 is 148 mm), or include approximately 0.39 (AL1 is 55.7 mm and AL2 is 142 mm).

As seen in FIG. 6, the sprocket support body 28 includes a first axial end 28B, a second axial end 28C, and an axially sprocket abutment surface 28D. The second axial end 28C is opposite to the first axial end 28B in the axial direction D2. The axial center plane CPL bisects the second axial length AL2 in the axial direction D2. The axially sprocket abutment surface 28D is positioned closer to the axial center plane CPL of the bicycle hub assembly 12 than the first axial end 28B in the axial direction D2. The second axial end 28C is positioned closer to the axial center plane CPL of the bicycle hub assembly 12 than the axial center plane CPL of the bicycle hub assembly 12 in the axial direction D2. The axially sprocket abutment surface 28D is provided on the larger-diameter part 42 in this embodiment whereas the axially sprocket abutment surface 28D can be provided on other parts of the bicycle hub assembly 12 according to need. The axially sprocket abutment surface 28D is in contact with the bicycle rear sprocket assembly 14 in a state where the bicycle rear sprocket assembly 14 is mounted on the sprocket support body 28. The axially sprocket abutment surface 28D faces the first axial end 28B in the axial direction D2.

As seen in FIG. 6, a sprocket-arranging axial length AL3 is defined between the first axial frame abutment surface 30B1 and the axially sprocket abutment surface 28D of the sprocket support body 28 in the axial direction D2. In this embodiment, the sprocket-arranging axial length AL3 ranges from 35 mm to 45 mm. For example, the sprocket-arranging axial length AL3 is 39.64 mm. The sprocket-arranging axial length AL3 can also be extended up to 44.25 mm, for example, by omitting the larger-diameter part 42. However, the sprocket-arranging axial length AL3 is not limited to this embodiment and the above range.

The larger-diameter part 42 has an axial end 42A which is the farthest from the first axial frame abutment surface 30B1 in the axial direction D2. An additional axial length AL4 is defined from the first axial frame abutment surface 30B1 to the axial end 42A in the axial direction D2. The additional axial length AL4 ranges from 38 mm to 47 mm. The additional axial length AL4 can range from 44 mm to 45 mm. The additional axial length AL4 can also range from 40 mm to 41 mm. In this embodiment, the additional axial length AL4 is 44.25 mm. However, the additional axial length AL4 is not limited to this embodiment and the above ranges.

A larger-diameter axial length AL5 of the larger-diameter part 42 ranges from 3 mm to 6 mm. In this embodiment, the larger-diameter axial length AL5 is 4.61 mm. However, the larger-diameter axial length AL5 is not limited to this embodiment and the above ranges.

A ratio of the first axial length AL1 to the sprocket-arranging axial length AL3 ranges from 1.2 to 1.7. For example, the ratio of the first axial length AL1 to the sprocket-arranging axial length AL3 is 1.4 if the first axial length AL1 is 55.7 mm and the sprocket-arranging axial length AL3 is 39.64 mm. However, the ratio of the first axial length AL1 to the sprocket-arranging axial length AL3 is not limited to this embodiment and the above range. For example, the ratio of the first axial length AL1 to the sprocket-arranging axial length AL3 can be 1.57 if the first axial length AL1 is 62.3 mm and the sprocket-arranging axial length AL3 is 39.64 mm, or the ratio of the first axial length AL1 to the sprocket-arranging axial length AL3 can be 1.69 if the first axial length AL1 is 67 mm and the sprocket-arranging axial length AL3 is 39.64 mm.

Figure 22:
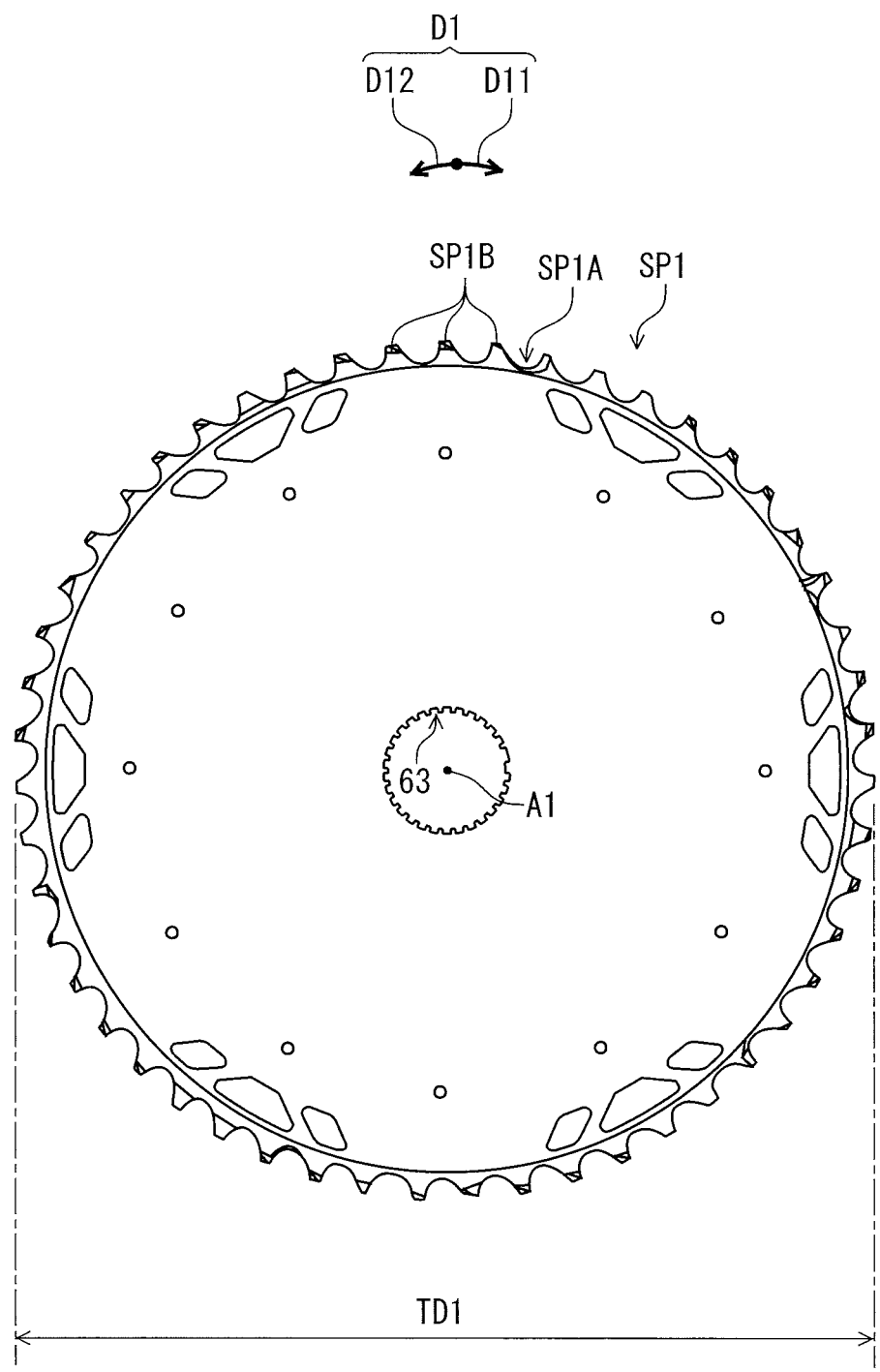
FIG. 22 is a side elevational view of a sprocket of the bicycle rear sprocket assembly illustrated in FIG. 2.

As seen in FIG. 22, the at least one sprocket includes a plurality of internal spline teeth configured to engage with the bicycle hub assembly 12. The at least one sprocket includes at least ten internal spline teeth configured to engage with the bicycle hub assembly 12. In this embodiment, the first sprocket SP1 includes the plurality of internal spline teeth 63 extending radially inwardly from the first sprocket body SP1A. The plurality of internal spline teeth 63 is configured to engage with the sprocket support body 28 (FIG. 4) of the bicycle hub assembly 12.

Figure 23:
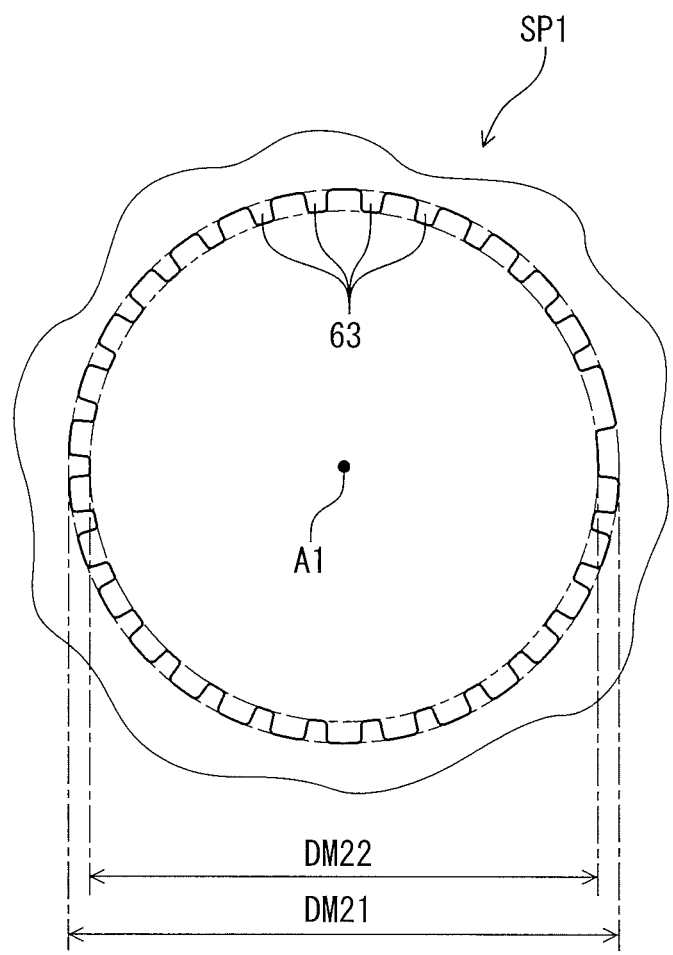
FIG. 23 is a partial enlarged side elevational view of the sprocket illustrated in FIG. 22.

As seen in FIG. 23, a total number of the at least ten internal spline teeth 63 is equal to or larger than 20. The total number of the at least ten internal spline teeth 63 is equal to or larger than 25. The total number of the at least ten internal spline teeth 63 of the second sprocket SP2 is equal to or larger than 28. The total number of the internal spline teeth 63 is equal to or smaller than 72. In this embodiment, the total number of the internal spline teeth 63 is 29. However, the total number of the internal spline teeth 63 is not limited to this embodiment and the above ranges.

The plurality of internal spline teeth 63 has an internal-spline major diameter DM22. The at least ten internal spline teeth 63 have the internal-spline major diameter DM22. As seen in FIG. 6, the maximum outer diameter MD1 of the internal cavity 38 is larger than the internal-spline major diameter DM22.

As seen in FIG. 6, the sprocket SP10 includes a plurality of internal spline teeth 64 extending radially inwardly from the first sprocket body SP10A. The plurality of internal spline teeth 64 of the sprocket SP10 has substantially the same structure as that of the plurality of internal spline teeth 63 of the first sprocket SP1. Thus, they will not be described in detail here for the sake of brevity. The sprockets SP2 to SP9, SP11, and SP12 do not includes the plurality of internal spline teeth. However, at least one of these sprockets can include the plurality of internal spline teeth. In such an embodiment, the plurality of internal spline teeth 63 can be omitted from the sprocket SP1. The plurality of internal spline teeth 63 can be omitted from the sprocket SP10.

Figure 24:
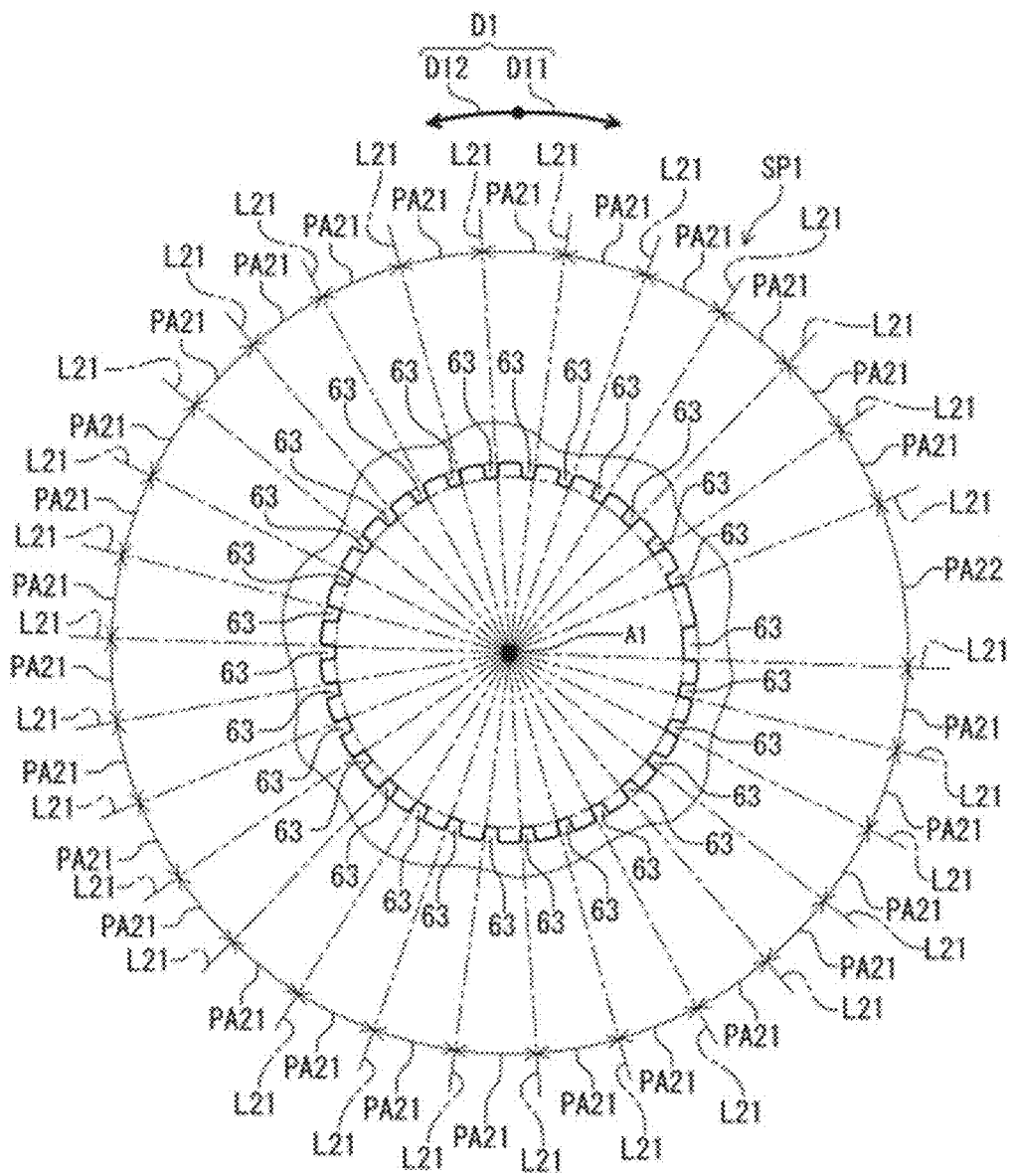
FIG. 24 is a partial enlarged side elevational view of the sprocket illustrated in FIG. 22.

As seen in FIG. 24, the at least ten internal spline teeth 63 have a first internal pitch angle PA21 and a second internal pitch angle PA22. At least two internal spline teeth of the at least ten internal spline teeth 63 of the sprocket SP1 are circumferentially arranged at the first internal pitch angle PA21 with respect to the rotational center axis A1 of the bicycle rear sprocket assembly 14. The at least two internal spline teeth of the at least ten spline teeth 63 are adjacent to each other without another spline tooth therebetween in the circumferential direction D1. In other words, at least two internal spline teeth of the plurality of internal spline teeth 63 are circumferentially arranged at the first internal pitch angle PA21 with respect to the rotational center axis A1 of the bicycle rear sprocket assembly 14. At least two internal spline teeth of the plurality of internal spline teeth 63 are circumferentially arranged at the second internal pitch angle PA22 with respect to the rotational center axis A1. The at least other two internal spline teeth of the at least ten spline teeth 63 of the first sprocket SP1 are adjacent to each other without another spline tooth therebetween in the circumferential direction D1. In other words, at least two of the plurality of spline teeth 63 of the first sprocket SP1 are circumferentially arranged at the second internal pitch angle PA22 with respect to the rotational center axis A1. In this embodiment, the second internal pitch angle PA22 is different from the first internal pitch angle PA21. However, the second internal pitch angle PA22 can be substantially equal to the first internal pitch angle PA21.

In this embodiment, the internal spline teeth 63 are circumferentially arranged at the first internal pitch angle PA21 in the circumferential direction D1. Two internal spline teeth of the internal spline teeth 63 is arranged at the second internal pitch angle PA22 in the circumferential direction D1. However, at least two internal spline teeth of the internal spline teeth 63 can be arranged at another internal pitch angle in the circumferential direction D1.

The first internal pitch angle PA21 ranges from 10 degrees to 20 degrees. The first internal pitch angle PA21 ranges from 12 degrees to 15 degrees. The first internal pitch angle PA21 ranges from 13 degrees to 14 degrees. In this embodiment, for example, the first internal pitch angle PA21 is 12 degrees. However, the first internal pitch angle PA21 is not limited to this embodiment and the above ranges.

The second internal pitch angle PA22 ranges from 5 degrees to 36 degrees. In this embodiment, the second internal pitch angle PA22 is 24 degrees. However, the second internal pitch angle PA22 is not limited to this embodiment and the above range.

Figure 25:
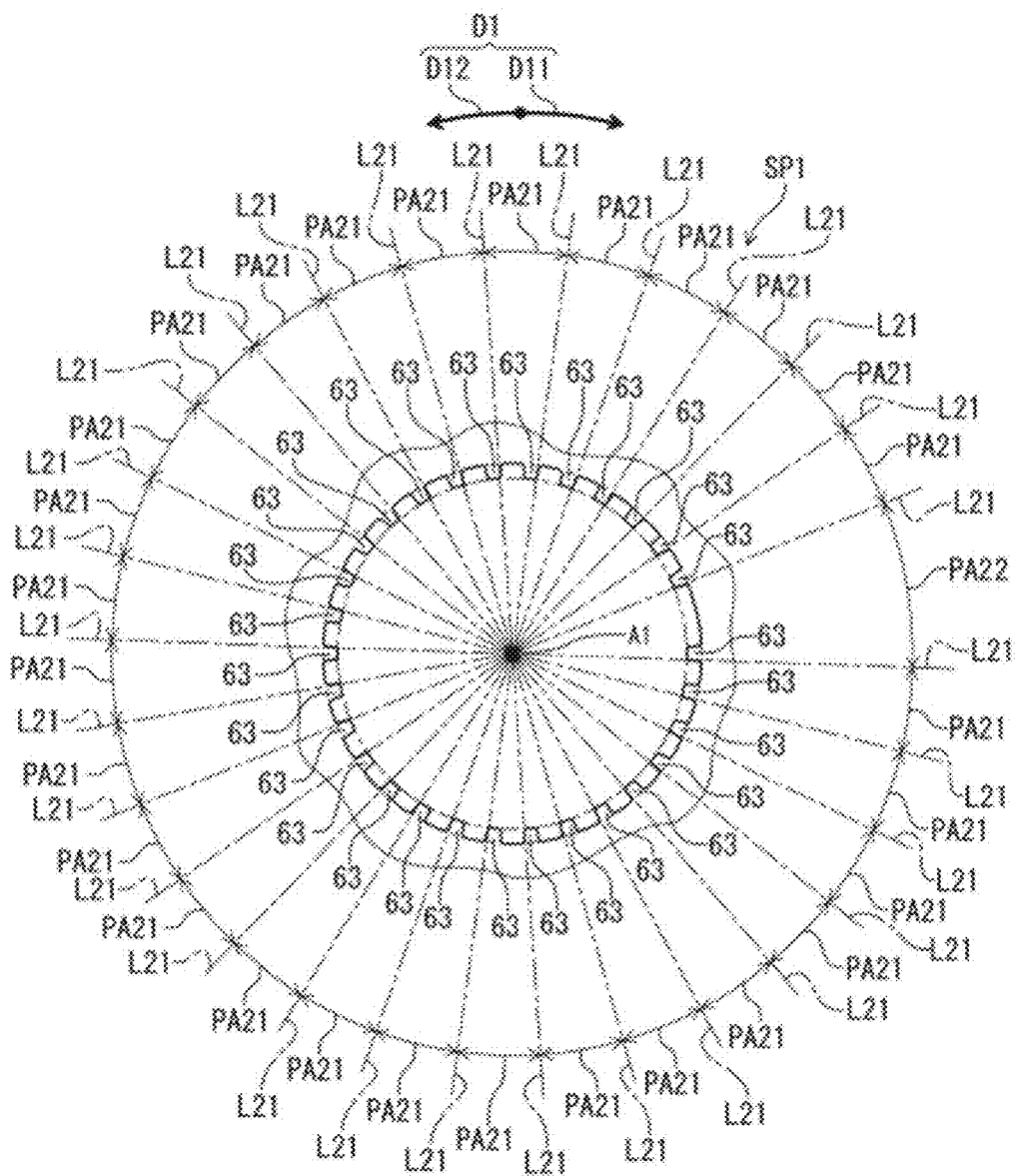
FIG. 25 is a partial enlarged side elevational view of the sprocket in accordance with a modification.

At least one of the at least ten internal spline teeth 63 has a first spline shape different from a second spline shape of another of the at least ten internal spline teeth 63. At least one of the at least ten internal spline teeth 63 has a first spline size different from a second spline size of another of the at least ten internal spline teeth 63. At least one of the at least ten internal spline teeth 63 has a cross-sectional shape different from a cross-sectional shape of another of the at least ten internal spline teeth 63. As seen in FIG. 25, however, the internal spline teeth 63 can have the same shape as each other. The at least ten internal spline teeth 63 can have the same size as each other. The at least ten internal spline teeth 63 can have the same cross-sectional shape as each other.

Figure 26:
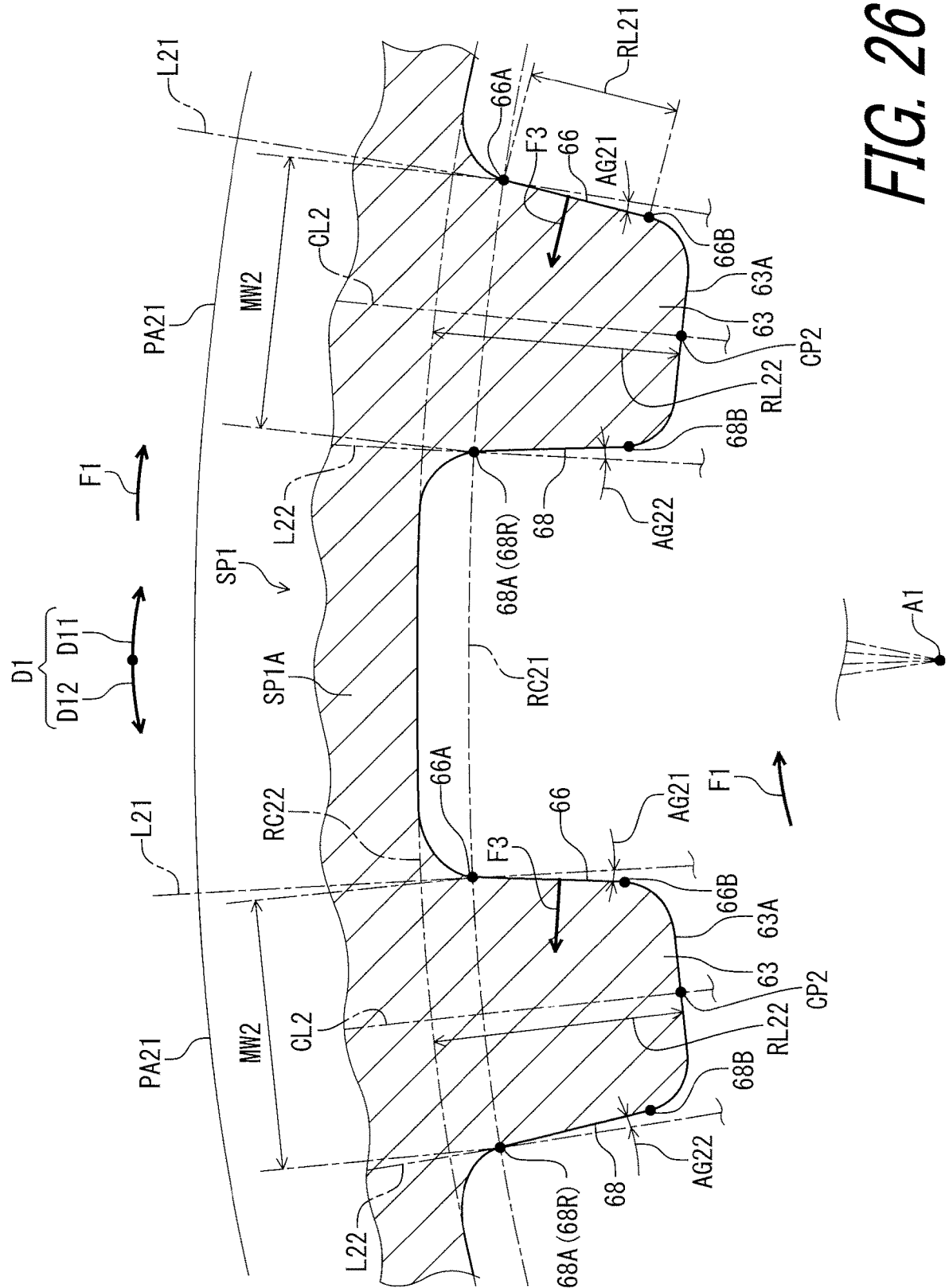
FIG. 26 is an enlarged cross-sectional view of the sprocket illustrated in FIG. 22.

As seen in FIG. 26, at least one of the at least ten internal spline teeth 63 includes an internal-spline driving surface 66. The at least one of the at least ten internal spline teeth 63 includes an internal-spline non-driving surface 68. The at least ten internal spline teeth 63 includes a plurality of internal-spline driving surfaces 66 to transmit the driving rotational force F1 to the bicycle hub assembly 12 (FIG. 6) during pedaling. The at least ten internal spline teeth 63 includes a plurality of internal-spline non-driving surfaces 68. The internal-spline driving surface 66 is contactable with the sprocket support body 28 to transmit the driving rotational force F1 from the sprocket SP1 to the sprocket support body 28 during pedaling. The internal-spline driving surface 66 faces in the driving rotational direction D11. The internal-spline driving surface 66 faces the external-spline driving surface 48 of the bicycle hub assembly 12 in a state where the bicycle rear sprocket assembly 14 is mounted to the bicycle hub assembly 12. The internal-spline non-driving surface 68 is provided on a reverse side of the internal-spline driving surface 66 in the circumferential direction D1. The internal-spline non-driving surface 68 faces in the reverse rotational direction D12 not to transmit the driving rotational force F1 from the sprocket SP1 to the sprocket support body 28 during pedaling. The internal-spline non-driving surface 68 faces the external-spline non-driving surface 50 of the bicycle hub assembly 12 in a state where the bicycle rear sprocket assembly 14 is mounted to the bicycle hub assembly 12.

The at least ten internal spline teeth 63 respectively have circumferential maximum widths MW2. The internal spline teeth 63 respectively have circumferential maximum widths MW2. The circumferential maximum width MW2 is defined as a maximum width to receive a thrust force F3 applied to the internal spline tooth 63. The circumferential maximum width MW2 is defined as a straight distance based on the internal-spline driving surface 66.

The plurality of internal-spline driving surfaces 66 each includes a radially outermost edge 66A and a radially innermost edge 66B. A second reference circle RC21 is defined on the radially outermost edge 66A and is centered at the rotational center axis A1. The second reference circle RC21 intersects with the internal-spline non-driving surface 68 has a reference point 68R. The circumferential maximum width MW2 extends straight from the radially innermost edge 66B to the reference point 68R in the circumferential direction D1.

The internal-spline non-driving surface 68 includes a radially outermost edge 68A and a radially innermost edge 68B. The internal-spline non-driving surface 68 extends from the radially outermost edge 68A to the radially innermost edge 68B. The reference point 68R is provided between the radially outermost edge 68A and the radially innermost edge 68B.

A total of the circumferential maximum widths MW2 is equal to or larger than 40 mm. The total of the circumferential maximum widths MW2 can be equal to or larger than 45 mm. The total of the circumferential maximum widths MW2 can be equal to or larger than 50 mm. In this embodiment, the total of the circumferential maximum widths MW2 is 50.8 mm. However, the total of the circumferential maximum widths MW2 is not limited to this embodiment.

As seen in FIG. 23, at least ten internal spline teeth 63 have an internal-spline minor diameter DM21. The plurality of internal spline teeth 63 has the internal-spline minor diameter DM21. The maximum outer diameter DM1 of the internal cavity 38 is larger than the internal-spline minor diameter DM21. The at least one internal spline tooth 63 of the first sprocket SP1 has an internal-spline root circle RC22 having the internal-spline minor diameter DM21. The internal-spline minor diameter DM21 equal to or smaller than 34 mm. The internal-spline minor diameter DM21 of the first sprocket SP1 is equal to or smaller than 33 mm. The internal-spline minor diameter DM21 of the first sprocket SP1 is equal to or larger than 29 mm. In this embodiment, the internal-spline minor diameter DM21 of the first sprocket SP1 is 32.8 mm. However, the internal-spline minor diameter DM21 of the first sprocket SP1 is not limited to this embodiment and the above ranges.

The internal-spline major diameter DM22 of the first sprocket SP1 equal to or smaller than 32 mm. The internal-spline major diameter DM22 is equal to or smaller than 31 mm. The internal-spline major diameter DM22 is equal to or larger than 28 mm. In this embodiment, the internal-spline major diameter DM22 is 30.4 mm. However, the internal-spline major diameter DM22 is not limited to this embodiment and the above ranges.

As seen in FIG. 22, the twelfth sprocket SP1 has a largest tooth-tip diameter TD1. The largest tooth-tip diameter TD1 is a maximum outer diameter defined by the plurality of twelfth sprocket teeth SP1B. A ratio of the internal-spline minor diameter DM21 (FIG. 23) to the largest tooth-tip diameter TD1 ranges from 0.15 to 0.18. In this embodiment, the ratio of the internal-spline minor diameter DM21 to the largest tooth-tip diameter TD1 is 0.15. However, the ratio of the internal-spline minor diameter DM21 to the largest tooth-tip diameter TD1 is not limited to this embodiment and the above ranges.

As seen in FIG. 26, the plurality of internal-spline driving surface 66 includes the radially outermost edge 66A and the radially innermost edge 66B. The plurality of internal-spline driving surfaces 66 each includes a radial length RL21 defined from the radially outermost edge 66A to the radially innermost edge 66B. A total of the radial lengths RL21 of the plurality of internal-spline driving surfaces 66 is equal to or larger than 7 mm. The total of the radial lengths RL21 is equal to or larger than 10 mm. The total of the radial lengths RL21 is equal to or larger than 15 mm. The total of the radial lengths RL21 is equal to or smaller than 36 mm. In this embodiment, the total of the radial lengths RL21 is 16.6 mm. However, the total of the radial lengths RL21 is not limited to this embodiment and the above ranges.

The plurality of internal spline tooth 63 has an additional radial length RL22. The additional radial lengths RL22 are respectively defined from the internal-spline root circle RC22 to radially innermost ends 63A of the plurality of internal spline teeth 63. A total of the additional radial lengths RL22 is equal to or larger than 12 mm. In this embodiment, the total of the additional radial lengths RL22 is 34.8 mm. However, the total of the additional radial lengths RL22 is not limited to this embodiment and the above ranges.

At least one of the at least ten internal spline teeth 63 of the first sprocket SP1 is circumferentially symmetric with respect to a reference line CL2. The reference line CL2 extends from the rotational center axis A1 to a circumferential center point CP2 of a radially innermost end 63A of the at least one of the at least ten internal spline teeth 63 in a radial direction with respect to the rotational center axis A1. However, at least one of the internal spline teeth 63 can have an asymmetric shape with respect to the reference line CL2. The at least one of the internal spline tooth 63 comprises the internal-spline driving surface 66 and the internal-spline non-driving surface 68.

The internal-spline driving surface has a first internal-spline-surface angle AG21. The first internal-spline-surface angle AG21 is defined between the internal-spline driving surface 66 and a first radial line L21. The first radial line L21 extends from the rotational center axis A1 of the bicycle rear sprocket assembly 14 to the radially outermost edge 66A of the internal-spline driving surface 66. The first internal pitch angle PA21 or the second internal pitch angle PA22 is defined between the first radial lines L21 (see, e.g., FIG. 33).

The internal-spline non-driving surface 68 has a second internal-spline-surface angle AG22. The second internal-spline-surface angle AG22 is defined between the internal-spline non-driving surface 68 and a second radial line L22. The second radial line L22 extends from the rotational center axis A1 of the bicycle rear sprocket assembly 14 to the radially outermost edge 68A of the internal-spline non-driving surface 68.

In this embodiment, the second internal-spline-surface angle AG22 is equal to the first internal-spline-surface angle AG21. However, the first internal-spline-surface angle AG21 can be different from the second internal-spline-surface angle AG22.

The first internal-spline-surface angle AG21 ranges from 0 degree to 6 degrees. The second internal-spline-surface angle ranges from 0 degree to 6 degrees. In this embodiment, the first internal-spline-surface angle AG21 is 5 degrees. The second internal-spline-surface angle AG22 is 5 degrees. However, the first internal-spline-surface angle AG21 and the second internal-spline-surface angle AG22 are not limited to this embodiment and the above ranges.

Figure 27:
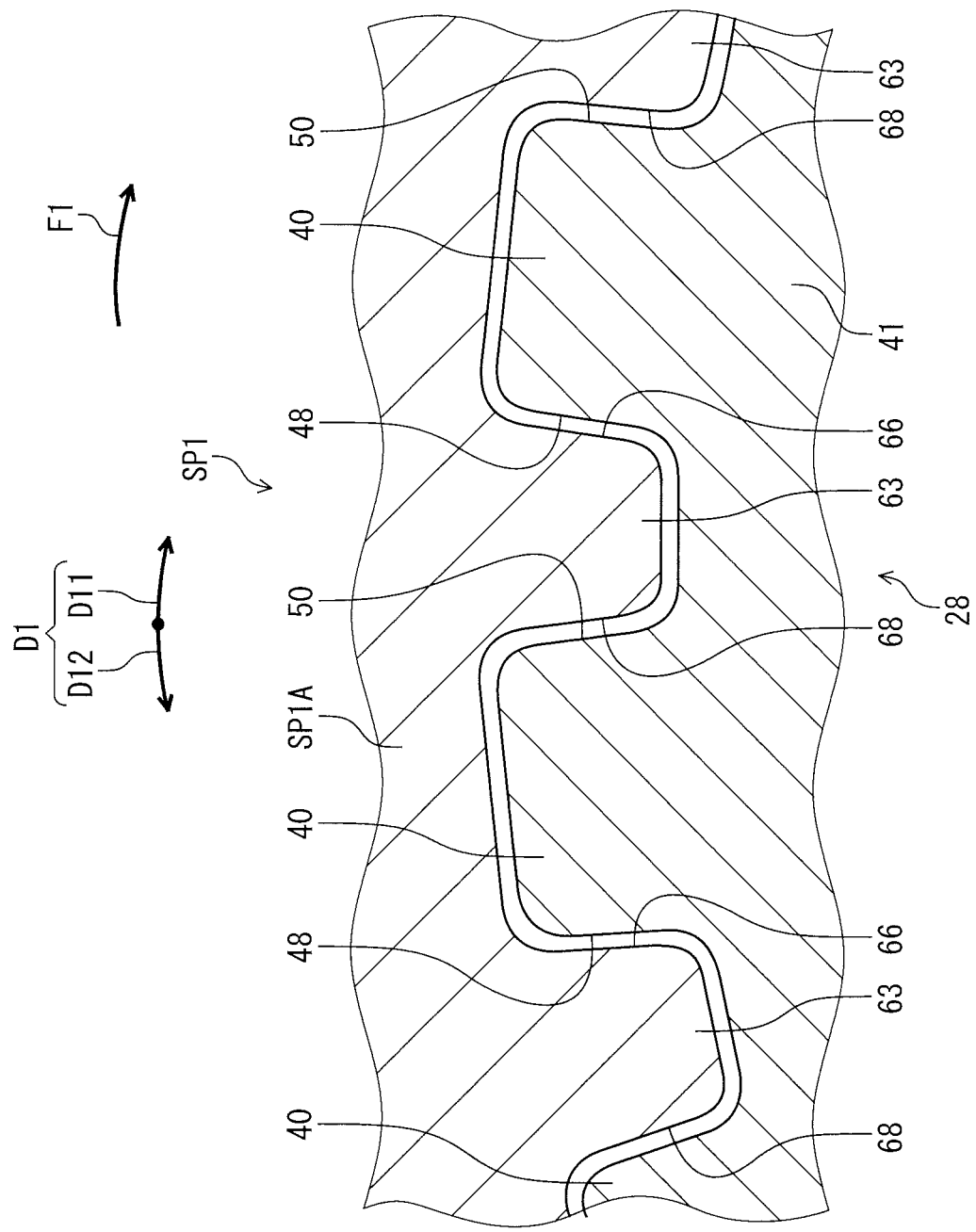
FIG. 27 is another cross-sectional view of the bicycle drive train illustrated in FIG. 2.

As seen in FIG. 27, the internal spline teeth 63 mesh with the external spline teeth 40 to transmit the driving rotational force F1 from the first sprocket SP1 to the sprocket support body 28. The internal-spline driving surface 66 is contactable with the external-spline driving surface 48 to transmit the driving rotational force F1 from the first sprocket SP1 to the sprocket support body 28. The internal-spline non-driving surface 68 is spaced apart from the external-spline non-driving surface 50 in a state where the internal-spline driving surface 66 is in contact with the external-spline driving surface 48.

As seen in FIGS. 15 and 16, the sprocket support body 28 includes a hub indicator 28I provided at an axial end of the base support 41. The hub indicator 28I is provided in an area of the second external pitch angle PA12 when viewed along the rotational center axis A1. In this embodiment, the hub indicator 28I includes a dot. However, the hub indicator 28I can include other shapes such as a triangle and a line. Further, the hub indicator 28I can be a separate member that is attached to the sprocket support body 28 e.g. with a bonding structure such as an adhesive agent. The position of the hub indicator 28I is not limited to this embodiment.

As seen in FIG. 7, the twelfth sprocket SP12 includes a sprocket indicator SP12I provided at an axial end of the sprocket body SP12A. In this embodiment, the sprocket indicator SP12I includes a dot. However, the sprocket indicator SP12I can include other shapes such as a triangle and a line. Further, the sprocket indicator SP12I can be a separate member that is attached to the sprocket SP12 e.g. with a bonding structure such as an adhesive agent. The position of the sprocket indicator SP12I is not limited to this embodiment. The sprocket indicator SP12I can be provided to any one of other sprockets SP1 to SP11.

As seen in FIG. 6, the bicycle hub assembly 12 further comprises a freewheel structure 78. The sprocket support body 28 is operatively coupled to the hub body 36 with the freewheel structure 78. The freewheel structure 78 is configured to couple the sprocket support body 28 to the hub body 36 to rotate the sprocket support body 28 along with the hub body 36 in the driving rotational direction D11 (FIG. 5) during pedaling. The freewheel structure 78 is configured to allow the sprocket support body 28 to rotate relative to the hub body 36 in the reverse rotational direction D12 (FIG. 5) during coasting. Accordingly, the freewheel structure 78 may be paraphrased into a one-way clutch structure 78. The freewheel structure 78 will be described in detail later.

The bicycle hub assembly 12 includes a first bearing 79A and a second bearing 79B. The first bearing 79A and the second bearing 79B are provided between the sprocket support body 28 and the hub axle 30 to rotatably support the sprocket support body 28 relative to the hub axle 30 about the rotational center axis A1.

In this embodiment, each of the sprocket support body 28, the brake-rotor support body 34, and the hub body 36 is made of a metallic material such as aluminum, iron, or titanium. However, at least one of the sprocket support body 28, the brake-rotor support body 34, and the hub body 36 can be made of a non-metallic material.

Second Embodiment

A bicycle rear sprocket assembly 214 in accordance with a second embodiment will be described below referring to FIGS. 28 to 30. The bicycle rear sprocket assembly 214 has the same structure as that of the bicycle rear sprocket assembly 14 except for the first sprocket SP1 and the second sprocket SP2. Thus, elements having substantially the same function as those in the first embodiment will be numbered the same here, and will not be described and/or illustrated again in detail here for the sake of brevity.

Figure 28:
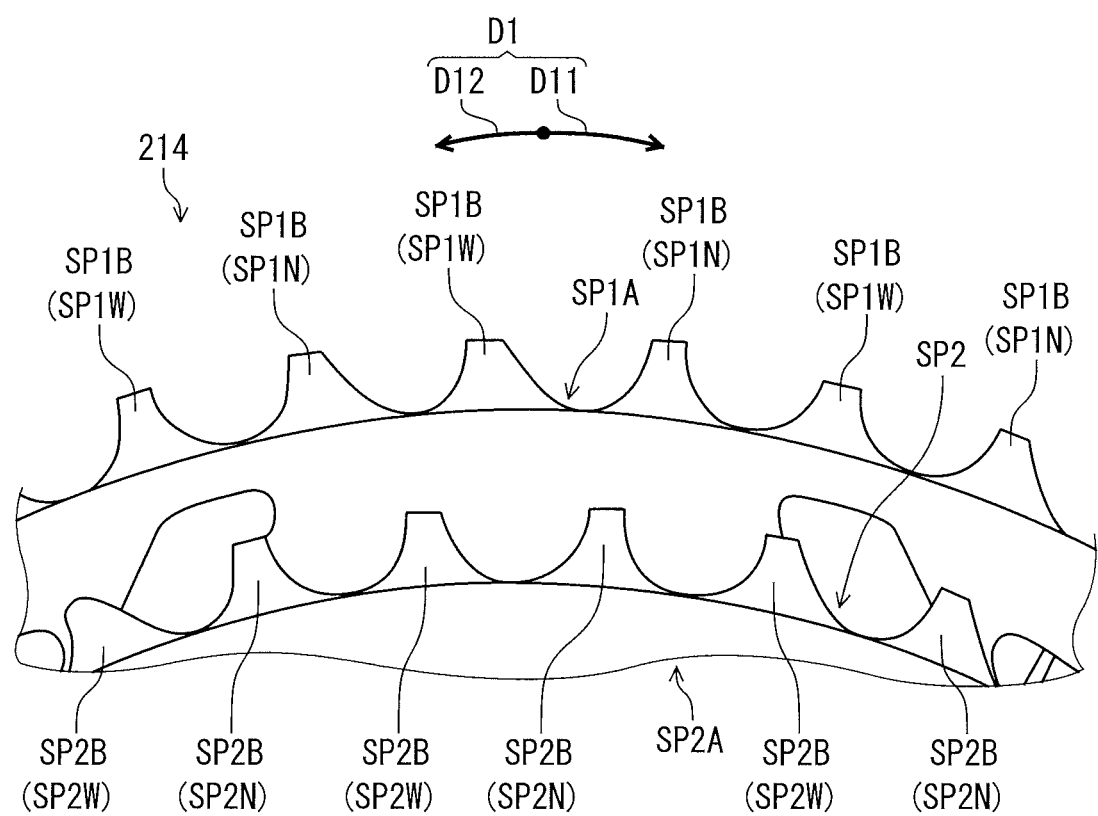
FIG. 28 is a side elevational view of a bicycle rear sprocket assembly in accordance with a second embodiment.

As seen in FIG. 28, in the bicycle rear sprocket assembly 214, the plurality of sprocket teeth SP1B includes at least one first tooth SP1W and at least one second tooth SP1N. In this embodiment, the plurality of sprocket teeth SP1B includes a plurality of first teeth SP and a plurality of second teeth SP1N. The first teeth SP and the second teeth SP1N are arranged alternately in the circumferential direction D1. A total number of the first teeth SP is equal to a total number of the second teeth SP2N. Namely, in this embodiment, a total number of the sprocket teeth SP1B is even. However, the total number of the first teeth SP1W is not limited to this embodiment. The total number of the second teeth SP1N is not limited to this embodiment. At least one of the first teeth SP can be omitted from the first sprocket SP1. At least one of the second teeth SP2W can be omitted from the first sprocket SP1.

Figure 29:
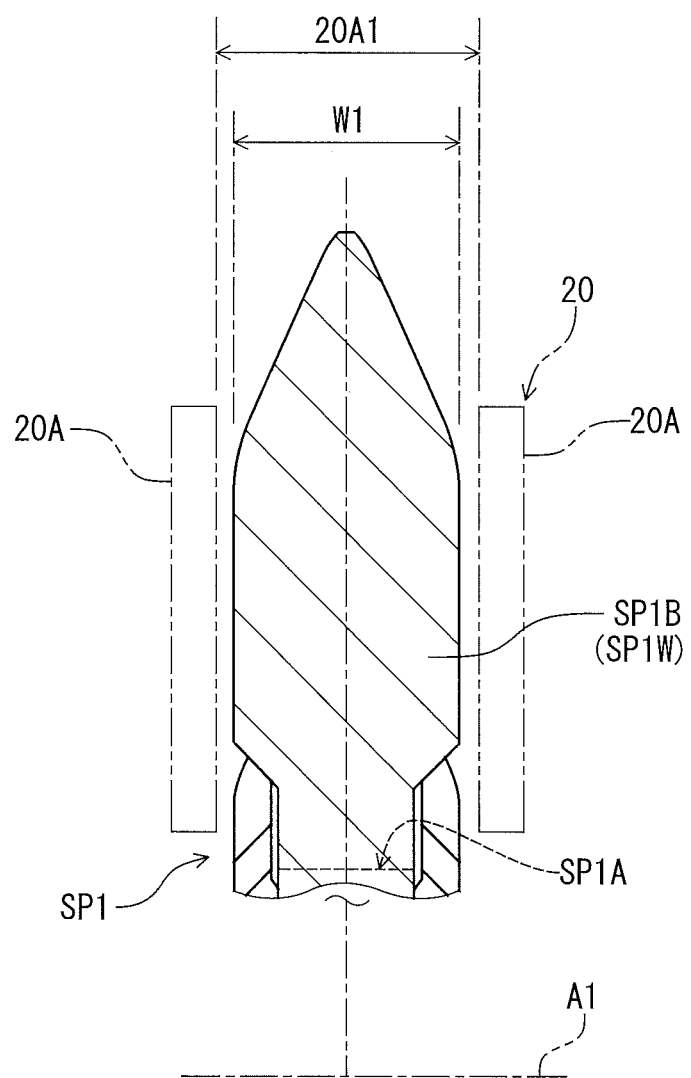
FIG. 29 is a cross-sectional view of a first tooth of the bicycle rear sprocket assembly illustrated in FIG. 28.

As seen in FIG. 29, the at least one first tooth SP1W has a first maximum axial width W1 defined in the axial direction D2 relative to the rotational center axis A1. In this embodiment, each of the first teeth SP has the first maximum axial width W1. The first maximum axial width W1 is smaller than an axial length of an outer link space 20A1 defined between an opposed pair of outer link plates 20A.

Figure 30:
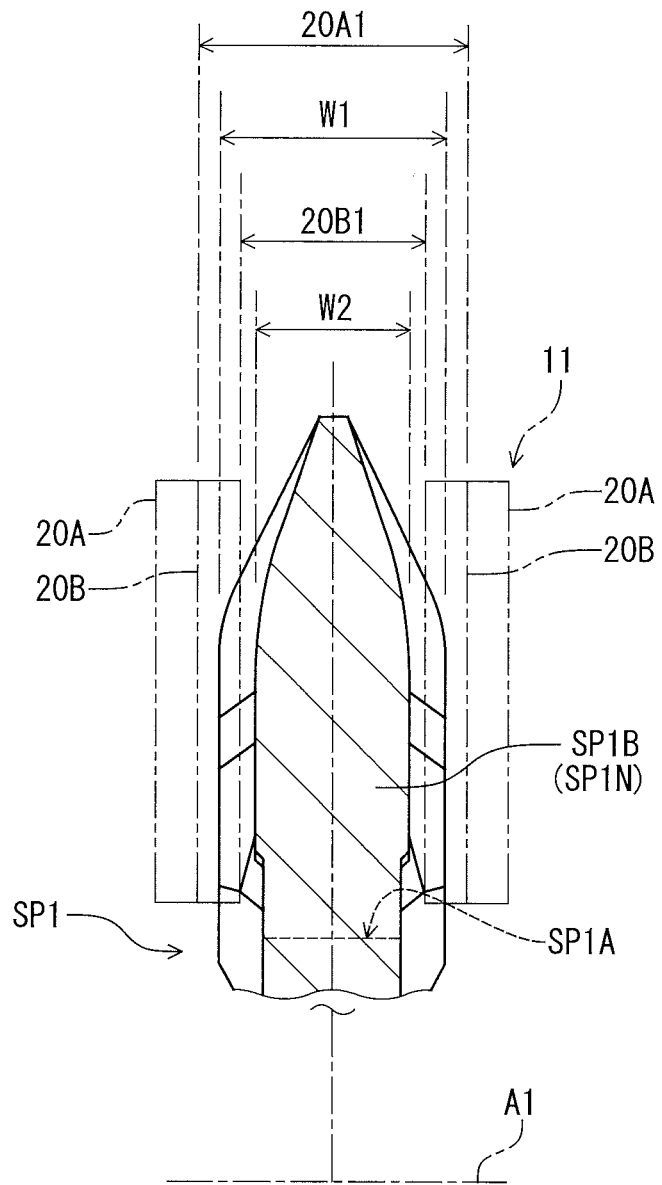
FIG. 30 is a cross-sectional view of a second tooth of the bicycle rear sprocket assembly illustrated in FIG. 28.

As seen in FIG. 30, the at least one second tooth SP1N has a second maximum axial width W2 defined in the axial direction D2. In this embodiment, each of the second teeth SP1N has the second maximum axial width W2. The first maximum axial width W1 is larger than the second maximum axial width W2. The first maximum axial width W1 is larger than an axial length of an inner link space 20B1 defined between an opposed pair of inner link plates 20B. The second maximum axial width W2 is smaller than the axial length of the inner link space 20B1. The first tooth SP1W is configured to engage with the opposed pair of outer link plates 20A. The second tooth SP1N is configured to engage with the opposed pair of inner link plates 20B.

As seen in FIG. 28, the plurality of sprocket teeth SP2B includes at least one first tooth SP2W and at least one second tooth SP2N. In this embodiment, the plurality of sprocket teeth SP2B includes a plurality of first teeth SP2W and a plurality of second teeth SP2N. The first tooth SP2W has substantially the same structure as that of the first tooth SP1W. The second tooth SP2N has substantially the same structure as that of the second tooth SP1N. Thus, they will not be described in detail here for the sake of brevity.

Third Embodiment

A bicycle rear sprocket assembly 314 in accordance with a second embodiment will be described below referring to FIGS. 31 to 33. The bicycle rear sprocket assembly 314 has the same structure as that of the bicycle rear sprocket assembly 14 except for the lock member 32. Thus, elements having substantially the same function as those in the first embodiment will be numbered the same here, and will not be described and/or illustrated again in detail here for the sake of brevity.

Figure 31:
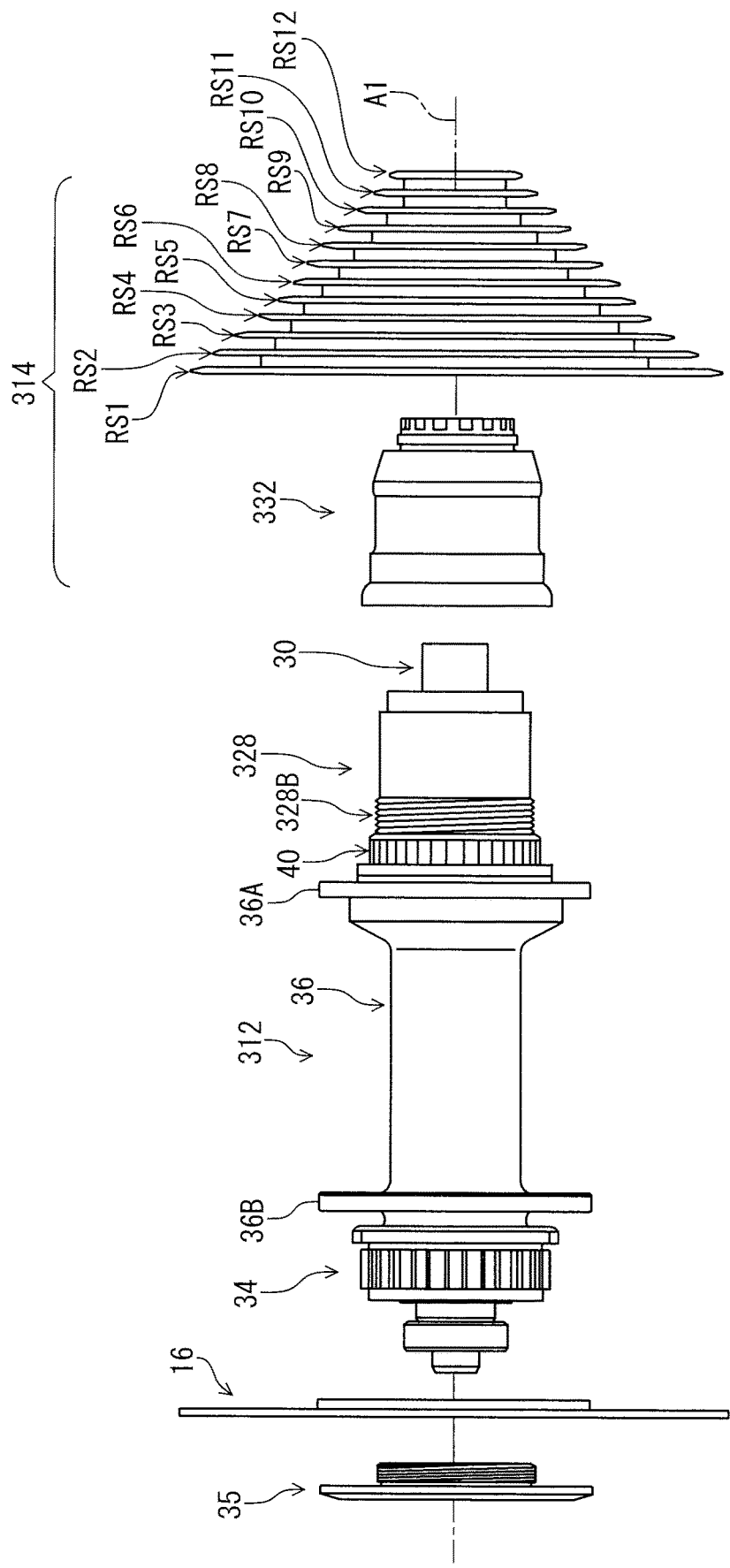
FIG. 31 is an exploded rear view of a bicycle rear sprocket assembly in accordance with a third embodiment.

As seen in FIG. 31, the bicycle rear sprocket assembly 314 comprises a lock member 332. The lock member 332 is configured to prevent an axial movement of the sprockets SP1 to SP12 relative to a sprocket support body 328 of a bicycle hub assembly 312 in a state where the lock member 332 is attached to the sprocket support body 328. The bicycle hub assembly 312 has substantially the same structure as that of the bicycle hub assembly 12 except for the sprocket support body 328.

The sprocket support body 328 includes the plurality of external spline teeth 40 and an externally-threaded portion 328B. An axial length of the external spline tooth 40 of the sprocket support body 328 is shorter than an axial length of the external spline tooth 40 of the sprocket support body 28. The plurality of external spline teeth 40 is provided between the externally-threaded portion 328B and the first spoke-mounting portion 36A in the axial direction D2.

Figure 32:
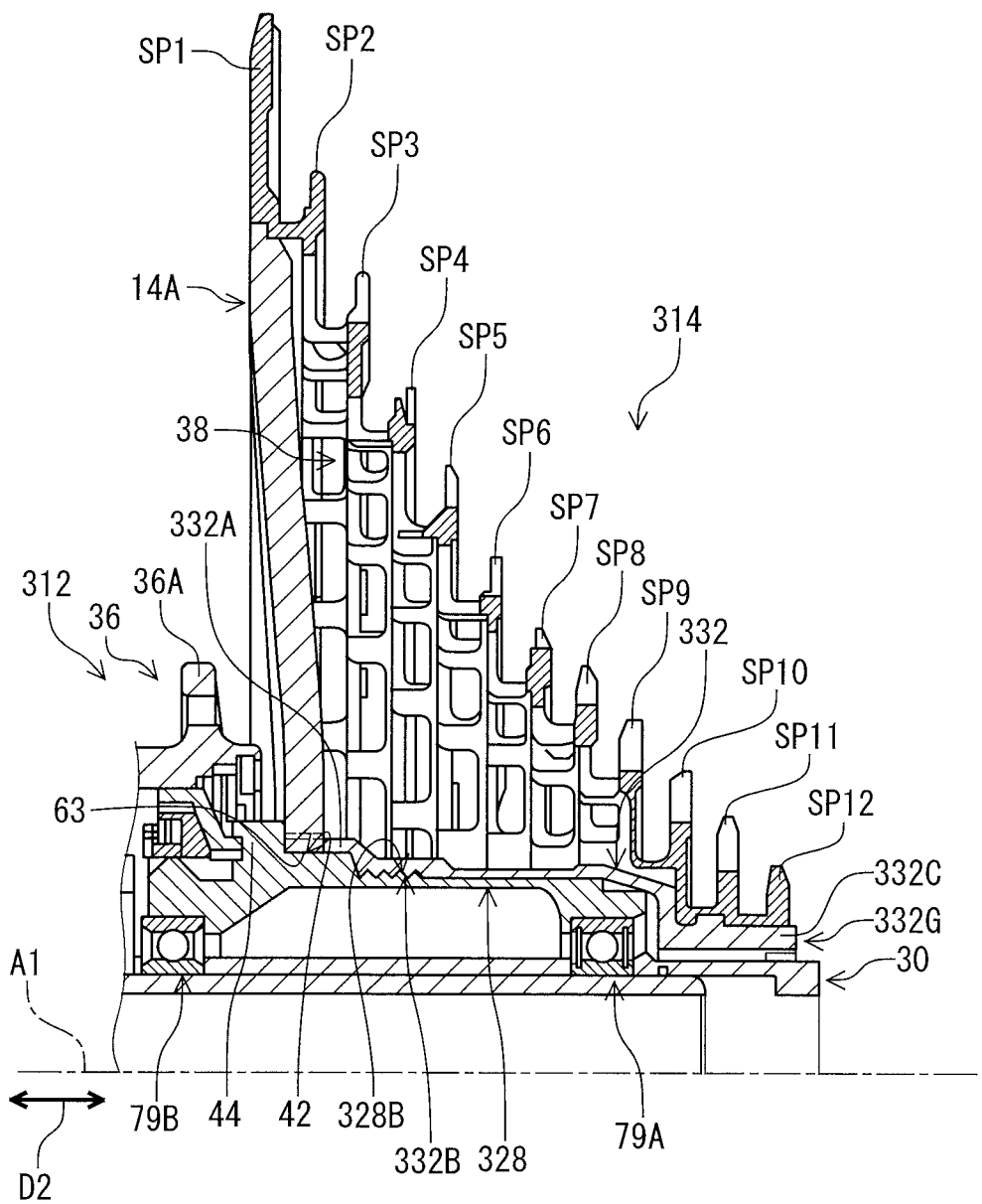
FIG. 32 is a partial cross-sectional view of the bicycle rear sprocket assembly illustrated in FIG. 31.

As seen in FIG. 32, the sprockets SP1 and SP2 have substantially the same structure as the structures of the sprockets SP1 and SP2 of the modification of the first embodiment shown in FIG. 10. Thus, the plurality of first sprocket teeth SP1B and the plurality of second sprocket teeth SP2B are integrally provided with each other as a one-piece unitary member.

The lock member 332 is rotatably coupled to the sprockets SP1 to SP12 about the rotational center axis A1. The sprockets SP1 to SP12, the coupling members CM1 to CM11, and the lock member 332 define the internal cavity 38. The lock member 332 includes a first axial end 332A and an internally-threaded portion 332B. The internally-threaded portion 332B is configured to threadedly engage with the externally-threaded portion 328B. The plurality of external spline teeth 40 is engaged with the plurality of internal spline teeth 63 of the cap member 14A attached to the first sprocket SP1. The cap member 14A is held between the larger-diameter part 42 and the first axial end 332A of the lock member 332 in the axial direction D2 in a state where the lock member 332 is secured to the sprocket support body 28 with the externally-threaded portion 328B and the internally-threaded portion 332B.

Figure 33:
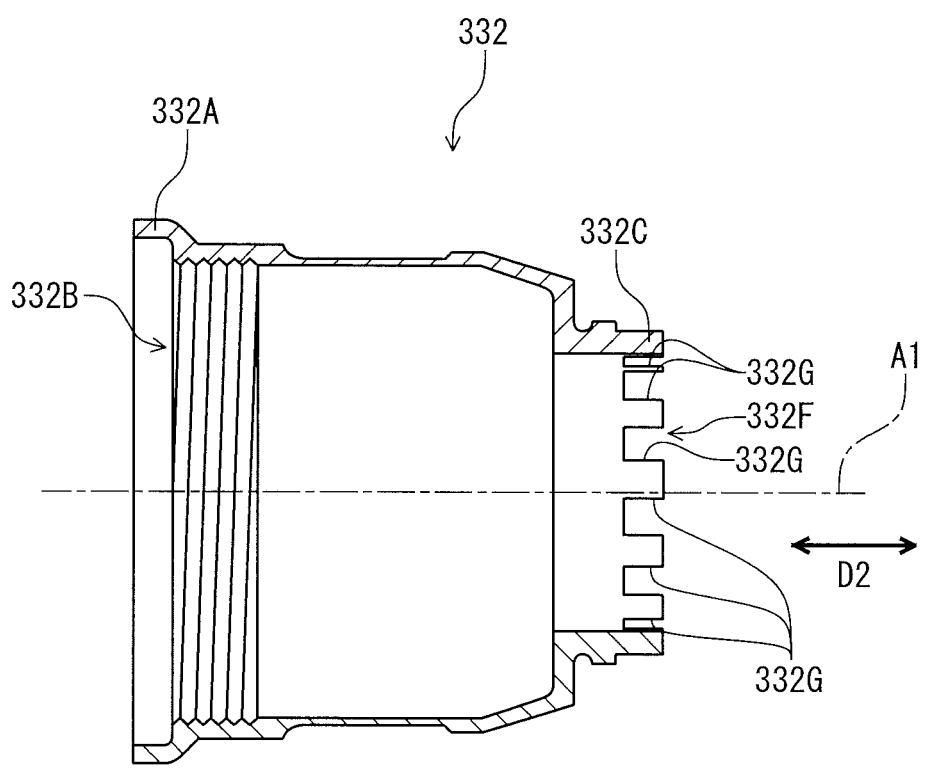
FIG. 33 is a cross-sectional view of a lock member of the bicycle rear sprocket assembly illustrated in FIG. 31.

As seen in FIG. 33, the lock member 332 has a second axial end 332C and a tool engagement portion 332F. The internally-threaded portion 332B is provided between the first axial end 332A and the second axial end 332C. The tool engagement portion 332F is provided at the second axial end 332C. In this embodiment, the tool engagement portion 332F includes a plurality of engagement grooves 332G to be engaged with the securing tool (not shown) when the lock member 332 is threadedly attached to the sprocket support body 28 with the externally-threaded portion 328B and the internally-threaded portion 332B.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:
1. A bicycle rear sprocket assembly comprising:
at least one sprocket including at least ten internal spline teeth configured to engage with a bicycle hub assembly, the at least ten internal spline teeth having an internal-spline major diameter; and
an internal cavity having a maximum outer diameter larger than the internal-spline major diameter, the at least ten internal spline teeth including a plurality of internal-spline driving surfaces to transmit a driving rotational force to the bicycle hub assembly during pedaling,
the plurality of internal-spline driving surfaces each including
a radially outermost edge,
a radially innermost edge, and
a radial length defined from the radially outermost edge to the radially innermost edge,
a total of the radial lengths of the plurality of internal-spline driving surfaces being equal to or larger than 7 mm,
the internal-spline driving surface having a first internal-spline-surface angle defined between the internal-spline driving surface and a radial line extending from a rotational center axis of the bicycle rear sprocket assembly, the first internal-spline-surface angle ranging from 0 degree to 6 degrees,
one tooth of the at least ten internal spline teeth has a first circumferential spline size,
other teeth of the at least ten internal spline teeth each have a second circumferential spline size that is smaller than the first circumferential spline size,
a total number of the other teeth of the at least ten external spline teeth being equal to or larger than nine,.
one space circumferentially adjacent to the one tooth of the at least ten internal spline teeth has a first circumferential space size, and
other spaces circumferentially adjacent to the other teeth of the at least ten internal spline teeth each have a second circumferential space size that is smaller than the first circumferential space size.

2. The bicycle rear sprocket assembly according to claim 1, wherein
a total number of the at least ten internal spline teeth is equal to or larger than 20.

3. The bicycle rear sprocket assembly according to claim 2, wherein
the total number of the at least ten internal spline teeth is equal to or larger than 25.

4. The bicycle rear sprocket assembly according to claim 1, wherein
the at least ten internal spline teeth have a first internal pitch angle and a second internal pitch angle different from the first internal pitch angle.

5. The bicycle rear sprocket assembly according to claim 1, wherein
at least one of the at least ten internal spline teeth has a first spline shape different from a second spline shape of another of the at least ten internal spline teeth.

6. A bicycle rear sprocket assembly comprising:
at least one sprocket including a plurality of internal spline teeth configured to engage with a bicycle hub assembly, at least two internal spline teeth of the plurality of internal spline teeth being circumferentially arranged at a first internal pitch angle with respect to a rotational center axis of the bicycle rear sprocket assembly, the first internal pitch angle ranging from 10 degrees to 20 degrees, the plurality of internal spline teeth having an internal-spline major diameter; and
an internal cavity having a maximum outer diameter larger than the internal-spline major diameter,
the at least two internal spline teeth including a plurality of internal-spline driving surfaces to transmit a driving rotational force to the bicycle hub assembly during pedaling,
the plurality of internal-spline driving surfaces each including
a radially outermost edge,
a radially innermost edge, and
a radial length defined from the radially outermost edge to the radially innermost edge,
a total of the radial lengths of the plurality of internal-spline driving surfaces being equal to or larger than 7 mm,
the internal-spline driving surface having a first internal-spline-surface angle defined between the internal-spline driving surface and a radial line extending from the rotational center axis, the first internal-spline-surface angle ranging from 0 degree to 6 degrees,
one tooth of the plurality of internal spline teeth has a first circumferential spline size,
other teeth of the plurality of internal spline teeth each have a second circumferential spline size that is smaller than the first circumferential spline size,
a total number of the other teeth of the plurality of external spline teeth being equal to or larger than nine,.
one space circumferentially adjacent to the one tooth of the plurality of internal spline teeth has a first circumferential space size, and
other spaces circumferentially adjacent to the other teeth of the plurality of internal spline teeth each have a second circumferential space size that is smaller than the first circumferential space size.

7. The bicycle rear sprocket assembly according to claim 6, wherein the first internal pitch angle ranges from 12 degrees to 15 degrees.

8. The bicycle rear sprocket assembly according to claim 7, wherein the first internal pitch angle ranges from 13 degrees to 14 degrees.

9. The bicycle rear sprocket assembly according to claim 6, wherein
at least two internal spline teeth of the plurality of internal spline teeth are circumferentially arranged at a second internal pitch angle with respect to the rotational center axis, and
the second internal pitch angle is different from the first internal pitch angle.

10. The bicycle rear sprocket assembly according to claim 1, wherein
the at least one sprocket includes a first sprocket,
the first sprocket includes a first sprocket body and a plurality of first sprocket teeth extending radially outwardly from the first sprocket body relative to a rotational center axis of the bicycle rear sprocket assembly, and
the first sprocket includes the plurality of internal spline teeth extending radially inwardly from the first sprocket body.

11. The bicycle rear sprocket assembly according to claim 10, wherein
the first sprocket has a pitch-circle diameter larger than the maximum outer diameter of the internal cavity.

12. The bicycle rear sprocket assembly according to claim 11, wherein
the pitch-circle diameter of the first sprocket is the largest pitch-circle diameter in the bicycle rear sprocket assembly.

13. The bicycle rear sprocket assembly according to claim 10, wherein
the at least one sprocket includes a second sprocket, the second sprocket includes a second sprocket body and a plurality of second sprocket teeth extending radially outwardly from the second sprocket body relative to the rotational center axis, and the internal cavity is provided radially inwardly of the second sprocket body.

14. The bicycle rear sprocket assembly according to claim 13, wherein the first sprocket is a separate member from the second sprocket.

15. The bicycle rear sprocket assembly according to claim 14, further comprising a coupling member coupling the first sprocket to the second sprocket.

16. The bicycle rear sprocket assembly according to claim 15, wherein the coupling member is integrally provided with at least one of the first sprocket and the second sprocket as a one-piece unitary member.

17. The bicycle rear sprocket assembly according to claim 16, wherein the coupling member includes at least one coupling pin.

18. The bicycle rear sprocket assembly according to claim 13, wherein the plurality of first sprocket teeth and the plurality of second sprocket teeth are integrally provided with each other as a one-piece unitary member.

19. The bicycle rear sprocket assembly according to claim 1, wherein the at least ten internal spline teeth have an internal-spline minor diameter, and the maximum outer diameter of the internal cavity is larger than the internal-spline minor diameter.

20. The bicycle rear sprocket assembly according to claim 1, wherein at least one of the at least one sprocket includes a sprocket body and a plurality of sprocket teeth extending radially outwardly from the sprocket body relative to a rotational center axis of the bicycle rear sprocket assembly, and the plurality of sprocket teeth includes at least one first tooth and at least one second tooth, the at least one first tooth has a first maximum axial width defined in an axial direction relative to the rotational center axis, the at least one second tooth has a second maximum axial width defined in the axial direction, and the first maximum axial width is larger than the second maximum axial width.

21. The bicycle rear sprocket assembly according to claim 1, wherein the at least one sprocket includes a smallest sprocket including at least one sprocket tooth, and a total number of the at least one sprocket tooth of the smallest sprocket is equal to or smaller than 10.

22. The bicycle rear sprocket assembly according to claim 1, wherein the at least one sprocket includes a largest sprocket including at least one sprocket tooth, and a total number of the at least one sprocket tooth of the largest sprocket is equal to or larger than 46.

23. The bicycle rear sprocket assembly according to claim 22, wherein the total number of the at least one sprocket tooth of the largest sprocket is equal to or larger than 50.

24. The bicycle rear sprocket assembly according to claim 1, wherein a total number of the at least one sprocket is equal to or larger than 11.

* * * * *